(12) United States Patent
Chen et al.

(10) Patent No.: US 11,350,476 B2
(45) Date of Patent: May 31, 2022

(54) TECHNIQUES TO RESTORE WIRELESS COMMUNICATION USING WIRELESS REFERENCE TRANSMISSION

(71) Applicant: ZTE Corporation, Guangdong (CN)

(72) Inventors: Yijian Chen, Guangdong (CN); Yu Ngok Li, Guangdong (CN); Bo Gao, Guangdong (CN); Zhaohua Lu, Guangdong (CN)

(73) Assignee: ZTE Corporation, Guangdong (CN)

( * ) Notice: Subject to any disclaimer, the term of this patent is extended or adjusted under 35 U.S.C. 154(b) by 58 days.

(21) Appl. No.: 16/789,110

(22) Filed: Feb. 12, 2020

(65) Prior Publication Data
US 2020/0187289 A1    Jun. 11, 2020

Related U.S. Application Data

(63) Continuation of application No. PCT/CN2017/097292, filed on Aug. 12, 2017.

(51) Int. Cl.
*H04W 76/19*    (2018.01)
*H04L 5/00*    (2006.01)

(52) U.S. Cl.
CPC ........... *H04W 76/19* (2018.02); *H04L 5/0048* (2013.01)

(58) Field of Classification Search
CPC ... H04B 7/0617; H04B 7/0695; H04W 76/19; H04L 5/0048; H04L 5/0057
See application file for complete search history.

(56) References Cited

U.S. PATENT DOCUMENTS

| | | |
|---|---|---|
| 2010/0003272 A1 | 1/2010 | Sieweke |
| 2012/0243426 A1* | 9/2012 | Matsui ................. H04L 1/1887 370/252 |

(Continued)

FOREIGN PATENT DOCUMENTS

| | | |
|---|---|---|
| CN | 101827444 A | 9/2010 |
| WO | 2012/020933 A2 | 2/2012 |

(Continued)

OTHER PUBLICATIONS

"General views on beam failure recovery", 3GPP TSG RAN WG1 NR Ad Hoc Meeting Qingdao, China, Jun. 27-30, 2017 (R1-1709929) (Year: 2017).*

(Continued)

*Primary Examiner* — Ian N Moore
*Assistant Examiner* — Sun Jong Kim
(74) *Attorney, Agent, or Firm* — Perkins Coie LLP

(57) ABSTRACT

One or more devices, systems, and/or methods involve communicating with a node using a wireless transmission; receiving a node transmission responsive to the wireless transmission; and transmitting a wireless reference transmission responsive to the node transmission. The wireless reference transmission is transmitted aperiodically and responsive to a node transmission received from the node. Additionally, one or more devices, systems, and/or methods involve receiving, from a node, a wireless transmission; transmitting, to the node, a node transmission about the wireless transmission; and receiving a wireless reference transmission from the node responsive to the node transmission.

20 Claims, 11 Drawing Sheets

(56) References Cited

U.S. PATENT DOCUMENTS

2015/0373674 A1* 12/2015 Han ................. H04W 16/14
370/329
2017/0302355 A1* 10/2017 Islam ................ H04W 72/042
2019/0150082 A1* 5/2019 Kedalagudde .......... H04W 4/46
370/329

FOREIGN PATENT DOCUMENTS

| WO | 2016/077701 A1 | 5/2016 |
| WO | 2017/0099639 A1 | 6/2017 |
| WO | 2018/190617 A1 | 10/2018 |

OTHER PUBLICATIONS

"Further views on mechanism to recover from beam failure", 3GPP TSG RAN WG1 NR Ad-Hoc#2 Qingdao, P.R. China Jun. 27-30, 2017 (R1-1711076) (Year: 2017).*

EP Extended Search Report, EP Appl. No. 17921448.1, dated Aug. 3, 2020, 11 pages.
NTT DOCOMO, Inc., "Further views on mechanism to recover from beam failure," 3GPP TSG RAN WG1 NR Ad-Hoc#2 Qingdao, P.R. China Jun. 27-30, 2017, 6 pages.
Huawei, HiSilicon, "General views on beam failure recovery" 3GPP TSG RAN WG1 NR Ad Hoc Meeting Qingdao, China, Jun. 27-30, 2017, 8 pages.
International Search Report and Written Opinion dated Apr. 27, 2018 for International Application No. PCT/CN2017/097292, filed on Aug. 12, 2017 (7 pages).
Guangdong Oppo Mobile Telecom, "On Beam Recovery Mechanism," 3GPP TSG RAN WG1 NR Ad-Hoc#2, R1-1710144, 6 pages, Jun. 2017.
NTT DOCOMO, Inc., "Further views on mechanism to recover from beam failure," 3GPP TSG RAN WG1 NR Ad-Hoc#2, Qingdao, P.R. China, R1-1711076, 6 pages, Jun. 2017.
NTT DOCOMO, Inc., "Views on mechanism to recover from beam failure," 3GPP TSG RAN WG1 Meeting #88, Athens, Greece, R1-1702799, 4 pages, Feb. 2017.

* cited by examiner

CHANNEL STATE INFO REFERENCE
TRANSMISSION (CSI-RS)

SYNCHRONIZATION
TRANSMISSION (SS)

TECHNIQUES TO RESTORE WIRELESS COMMUNICATION USING WIRELESS REFERENCE TRANSMISSION

CROSS REFERENCE TO RELATED APPLICATIONS

This patent document is a continuation of and claims priority to International Patent Application No. PCT/CN2017/097292, filed on Aug. 12, 2017. The entire content of the before-mentioned patent application is incorporated by reference as part of the disclosure of this application.

BACKGROUND

Wireless communication links are often established between and among nodes (such as user equipment (UE) devices and/or base stations (BS)) using a wireless transmission. Wireless transmissions often include a periodically transmitted beam reference transmission, which the receiving node may measure to evaluate the wireless communication link.

In some scenarios, the wireless transmission comprises a beamformed transmission, in which the transmitter selectively forms a beam of communication in the direction of a receiver. The base station may transmit the transmission from a plurality of antennae with a selectable delay, wherein a receiver at a particular location receives the transmissions from the multiple antennae at approximately the same time, such that constructive interference of the individual transmissions amplifies the transmission received by the receiver. Because the beamformed transmission may be more susceptible to attenuation (e.g., due to interference, changes of position of the base station and/or the user equipment, and/or mistiming of the timing offset of the transmissions by the respective antennae), the base station may periodically transmit one or more wireless reference transmissions whereby the wireless transmission quality of the wireless transmission may be evaluated and/or monitored.

SUMMARY

In accordance with the present disclosure, one or more devices and/or methods for facilitating transmission of a configuration are provided.

In an embodiment, a device may communicate with a node using a wireless transmission; receive a node transmission responsive to the wireless transmission; and transmit a wireless reference transmission responsive to the node transmission.

In an embodiment, a device may communicate with a node using a wireless transmission, and transmit a wireless reference transmission aperiodically and responsive to a node transmission received from the node.

In an embodiment, a device may receive, from a node, a wireless transmission; transmit, to the node, a node transmission about the wireless transmission; and receive a wireless reference transmission from the node responsive to the node transmission.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Figure 1A:
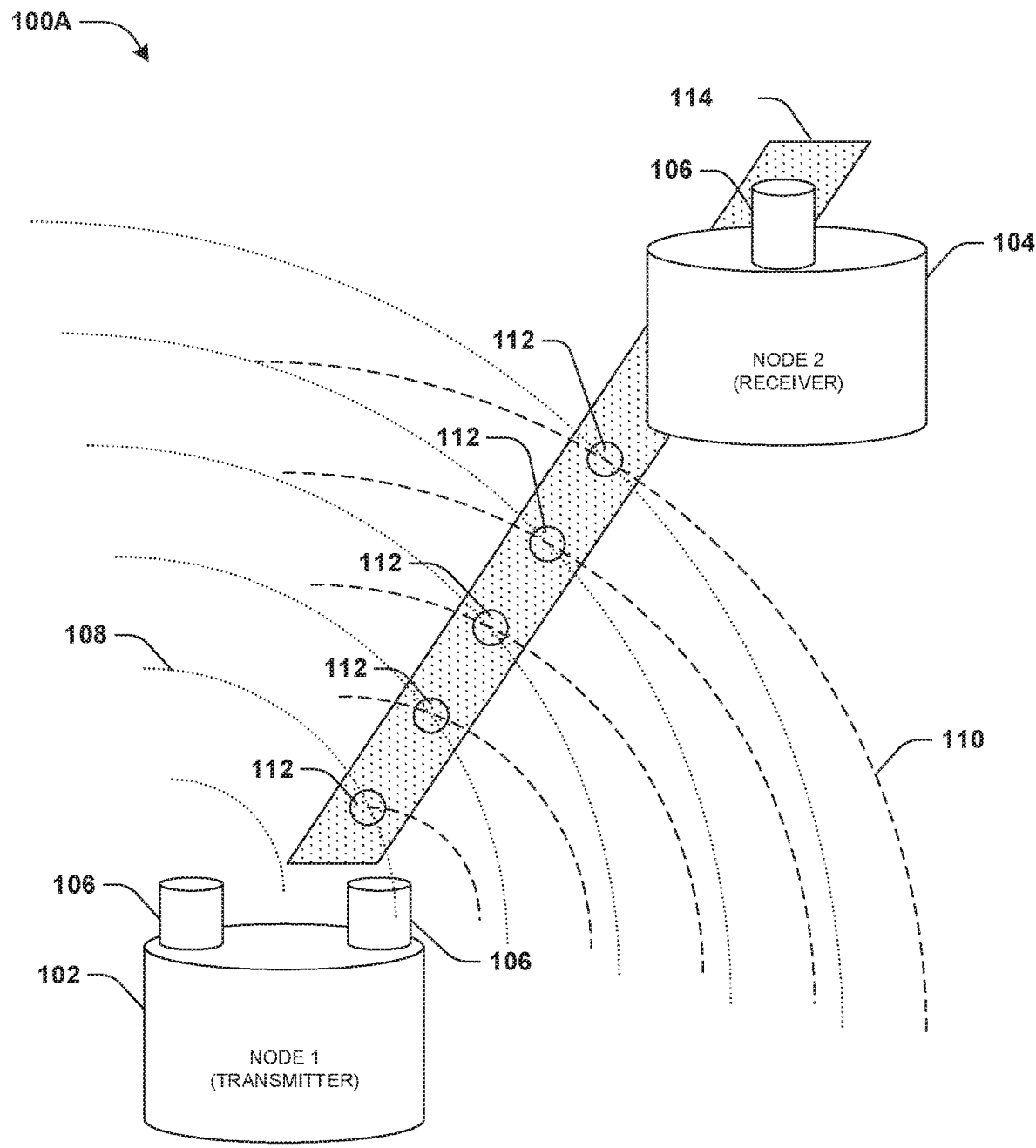
FIG. 1A is an illustration of an example scenario featuring a wireless transmission between a transmitter and a receiver.

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

In the field of communication, many scenarios involve wireless transmissions among various nodes, such as one or more base stations (BS) and one or more user equipment (UE) devices. The wireless transmissions may comprise, e.g., voice, sound, images, video, code, messages, documents, data generated by a component such as a sensor, data for use by an application, or a combination thereof. The nodes may communicate in various ways, such as analog and/or digital; unidirectionally and/or bidirectionally; consecutively and/or concurrently; synchronously and/or asynchronously; and point-to-point, multicast, and/or broadcast. The wireless communication may utilize various portions of the electromagnetic spectrum and/or may comprise a variety of standards and/or protocols, such as (e.g.) AM/FM radio, WiFi, WiMAX, Bluetooth, infrared, and/or 3G/3.5G/4G/LTE/etc. Wireless communication may be established between and among any number of devices serving as nodes, and such nodes may be organized according to various architectures and/or topologies, such as peer-to-peer, server/client, and linear, ring, and/or hierarchical topologies, where such organization may be established in a static, dynamic, or ad hoc manner. The wireless transmissions may utilize a variety of additional techniques and features, such as (e.g.) addressing, sequencing, routing, repeating, relaying, acknowledgment, error detection and correction, encryption, authentication, and fault detection and/or recovery.

One or more computing devices and/or techniques for facilitating access to one or more uplink carriers and/or release of the one or more uplink carriers are provided. For example, a user equipment may connect to a (e.g., wireless communication) network via a base station of the network. The UE may use one or more uplink carriers for data transmission to the base station and/or the network. However, the user equipment device may need to cease using one or more uplink carriers for data transmission and/or may need to (e.g., begin) using one or more different uplink carriers due to changes in a service demand and/or a location of the user equipment device. Thus, the user equipment device may receive one or more configurations. The one or more configurations may comprise one or more cell configurations comprising a primary cell configuration and/or one or more secondary cell configurations. A primary cell corresponding to the primary cell configuration may be used to receive and/or send (e.g., secure) parameters and/or non-access stratum (NAS) mobility features. One or more secondary cells corresponding to the one or more secondary cell configurations may be used to provide data service for the user equipment device. One or more cells corresponding to the one or more cell configurations may comprise one or more uplink carriers. The one or more cells may comprise fewer uplink carriers than downlink carriers, and systems that may use an uplink frequency band more than downlink frequency bands may be limited with (e.g., low) data rates, efficiency, etc. Thus, in accordance with one or more of the techniques presented herein, the one or more cells may comprise fewer downlink carriers than uplink carriers. The user equipment device may access (e.g., identify, use, communicate via, etc.) the one or more uplink carriers based upon the one or more configurations and/or one or more add instructions. The UE may release (e.g., information of) the one or more uplink carriers based upon the one or more configurations and/or one or more delete instructions.

In such scenarios, wireless transmission quality and fidelity are frequent considerations, whereby it is desirable for a receiver to receive a wireless transmission from a transmitter without significant distortion, such that the information content of the transmission received by the receiver matches the information content transmitted by the transmitter. Properties that may interfere with wireless transmission quality include, e.g., distance between the nodes, sensitivity and/or distortion imposed by the transmitting and/or receiving components such as antennae, and/or electromagnetic interference by other transmissions from the same or other devices. One technique for improving the wireless transmission quality of the transmission received by the receiver is amplifying the transmission of the transmitter, but such amplification may be inefficient due to diminishing returns, and/or may involve excessive power consumption by the transmitter, which may be undesirable, for example, if the transmitter has a limited power reserve such as from a battery, and/or if amplification causes interference with other wireless transmissions by other devices.

Many other techniques may be utilized to preserve and/or promote the wireless transmission quality and fidelity of the transmission between a transmitter and a receiver. Some such techniques involve beamforming, wherein the transmitter utilizes principles of electromagnetic constructive interference in a manner that selectively promote the power of the transmission received by the receiver. Such techniques may promote the wireless transmission quality at the receiver while only modestly increasing the power of the wireless transmission by the transmitter.

FIG. 1A is an illustration of an example scenario 100A featuring a first node acting as a beamforming transmitter 102 and a second node acting as a receiver 104. In this example scenario 100A, the transmitter 102 comprises both a first antenna 106 that generates a first wireless transmission 108, and a second antenna 106 that generates a second wireless transmission 108 with an advance and/or delay relative to the first transmission 108 by the first antenna 106. The transmissions may utilize various waveforms (e.g., sinusoids of varying frequency, amplitude, and/or phase), and the advance and/or delay between the transmissions creates a variable phase shift in the transmission received by an antenna 106 of the receiver 104. Moreover, the relative phase shift between a first transmission 108 by the first antenna 106 of the transmitter 102 and a second transmission 110 by the second antenna 106 of the transmitter 102 varies based upon the angle at which the transmissions are detected relative to the orientation of the antennae 106. In most locations, the interference between the transmissions is negligible and/or destructive; however, at certain locations 112, the interference between the waveforms of the transmissions operates in a constructive manner, resulting in a relative amplification that is approximately the sum of the amplitudes of the transmissions from the respective antennae 106. For example, if both antennae 106 of the transmitter 102 each transmit at the same power, constructive interference may cause the transmission to be perceived with twice the amplitude of either antenna 106. Moreover, the locations 112 at which constructive interference occurs may occur linearly in the form of a beam 114, such that the positioning of the receiver 104 at any along the beam 114 results in a relatively strong wireless transmission quality and fidelity as compared with other locations. The transmitter 102 may select and/or adjust the direction of the beam 114 by varying the relative delay in the transmission by the antennae 106; e.g., a smaller delay may adjust the direction of the beam 114 toward a normal orientation with respect to an axial alignment of the antennae 106, while a greater delay may adjust the direction of the beam 114 toward a parallel orientation with respect to the axial alignment of the antennae 106. In this manner, the transmitter 102 may utilize a beamforming technique to direct the wireless transmission selectively toward the node 104, which may promote wireless transmission quality. The transmitter 102 may also communicate with a plurality of receivers 104 concurrently using an array of antennae 106 that generate beams 114 in different directions toward the respective receivers 104, e.g., utilizing weighting techniques to adjust the relative delay of the transmission by the respective antennae 106 to achieve beamforming directed toward a specific receiver 104.

In many wireless transmission scenarios, detecting, establishing, and maintaining the wireless transmission quality of a receiver 104 may be difficult, e.g., in view of variations in transmission and/or reception quality, undesirable interference from other transmissions by the same or other devices, and/or changing atmospheric characteristics. As one such example, while the beamforming example 100A of FIG. 1 may promote the receipt of the wireless transmission quality at the receiver 104 with only a modest increase in transmission power by the transmitter 102, such techniques are dependent upon the position of the transmitter 102 and receiver 104 relative to the beam 114 formed thereby, and displacement of either or both nodes may reduce the constructive interference at the receiver 104 and may attenuate the transmission at the receiver 104. Accordingly, it may be desirable to incorporate one or more wireless reference transmissions in the wireless transmission, e.g., to enable the transmitter 102 and/or receiver 104 to detect, monitor, measure, and/or verify the wireless transmission quality and fidelity of the transmission. Many forms of wireless reference transmissions may be utilized that may reflect various properties of the wireless transmission, and may enable the detection, analysis, and/or recovery from various forms of partial or total communication loss of the wireless transmission.

Figure 1B:
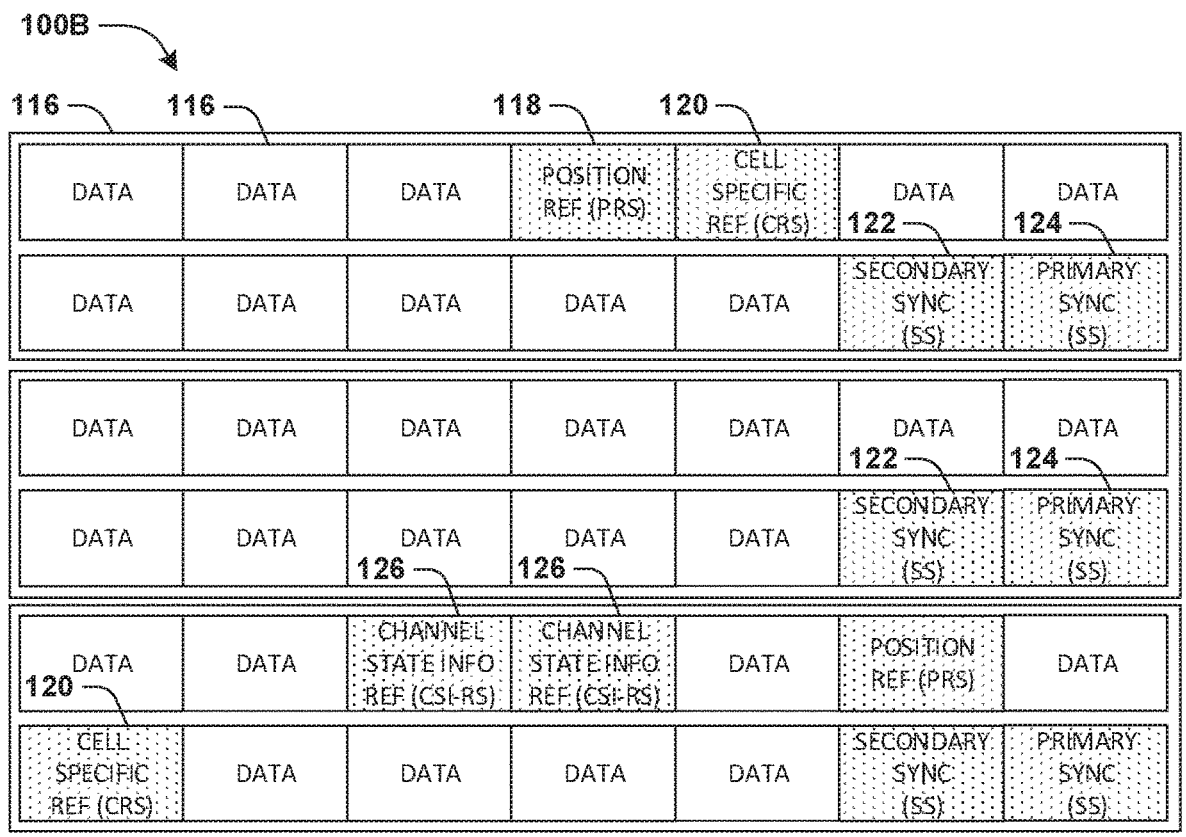
FIG. 1B is an illustration of an example communication process between a transmitter and a receiver.

In many such scenarios, a wireless transmission may include a variety of wireless reference transmission that are generated by the transmitter in a periodic manner. FIG. 1B is an illustration of an example scenario 100B featuring a series of wireless transmission frames 116 (e.g., in an LTE wireless transmission technique) that include a variety of periodic wireless reference signals. In this example scenario 100B, the wireless transmission is organized as a sequence of fixed-duration segments or packets, some of which carry data 116 that is transmitted from the transmitter 102 to the receiver 104 (e.g., voice samples, images, messages, and/or application data). Various wireless reference transmissions are inserted between data segments periodically and at regular intervals, such as a position reference signal (PRS) 118; a cell-specific reference signal (CRS); a synchronization signal comprising a primary sync signal 124 that occurs between wireless transmission frames 116, and a secondary sync signal 122 that occurs within the wireless transmission frames 116; and a channel state information reference signal (CSI-RS) 126. These wireless reference transmissions may convey information about the wireless transmission, such as identification, transmission types, timing, and/or frame length and format. A transmitter 102 may periodically insert the wireless reference transmissions into the data sequence of the wireless transmission, and a receiver 104 may detect, monitor, measure, and analyze the wireless reference signals to establish and maintain wireless communication with the transmitter 102, including detecting a communication loss such as attenuation and/or distortion. The use of wireless reference transmissions may be particularly significant for wireless transmissions that are more prone to various forms of communication loss, including the beamforming technique illustrated in the example scenario 100A of FIG. 1A.

Figure 1C:
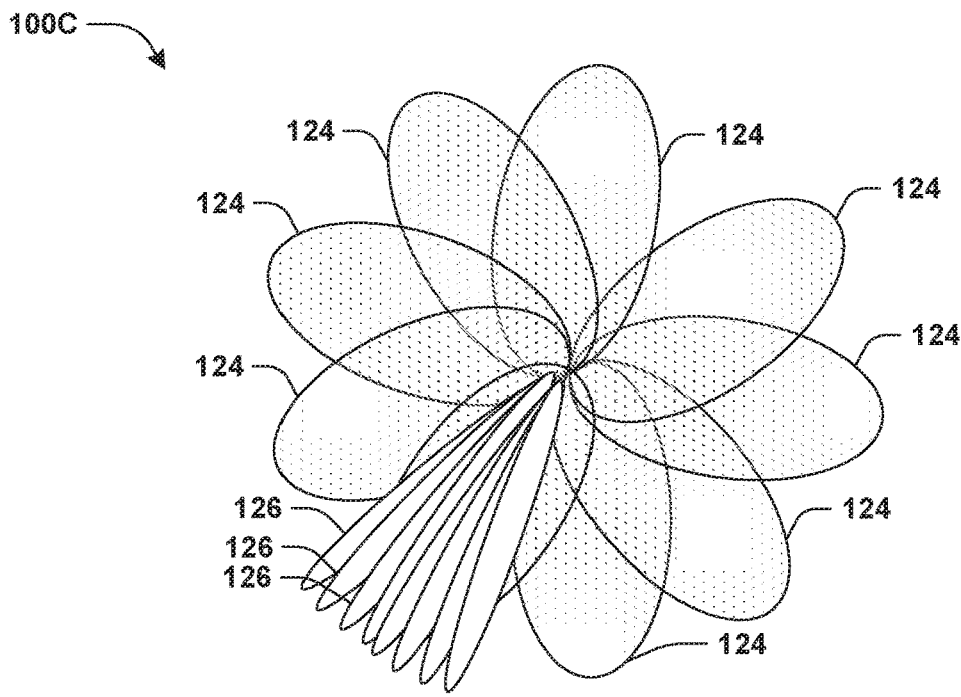
FIG. 1C is an illustration of an example communication process of a wireless transmission segmented into channels.

In many such scenarios, a wireless signal transmission may be shared among a set of nodes, and a variety of wireless reference transmissions may be included in the wireless transmission, wherein distinct subsets of wireless reference transmissions may be differently received and utilized by different nodes. FIG. 1C is an illustration of an example scenario 100C in which a wireless transmission may be partitioned into a set of channels. A particular synchronization transmission 124 (SS) may be utilized for respective beams 114, of a beamformed transmission. Moreover, various channels within the beam may be associated with different channel state information reference transmissions 126 (CSI-RS), such that two nodes utilizing different channels may utilize the same synchronization transmission 114 but different channel state information reference transmissions 126.

Figure 2:
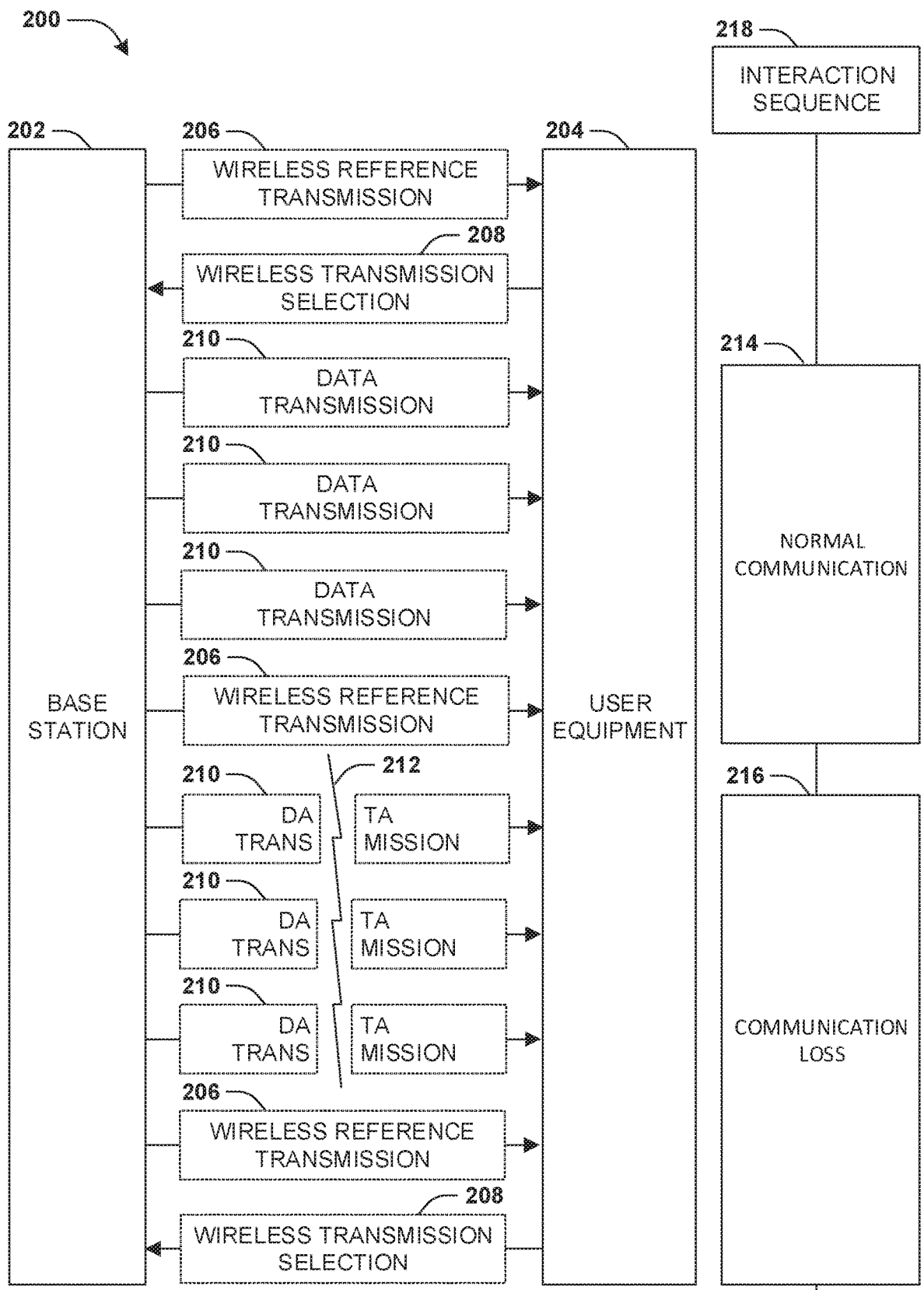
FIG. 2 is an illustration of another example communication process between a transmitter and a receiver.

The example scenario 200 of FIG. 2 presents an illustration of an interaction sequence 218 between a base station 202 and a user equipment 204 device as a sequence of bidirectional wireless transmissions. In this example scenario 200, the base station 202 initiates the wireless communication by transmitting wireless reference transmission 206, which the user equipment 204 receives and utilizes to perform a wireless transmission selection 208 (e.g., a selection of a beam selection among a variety of beamformed transmissions, which the user equipment 204 may choose by measuring and comparing the wireless signal quality of the respective beams 114 and choosing the beam 114 presenting the highest wireless signal quality). The user equipment 204 may communicate the selection to the base station 202 as a wireless transmission selection 208, such as indicating a beam identifier of a selected beamformed transmission. The base station 202 may then initiate a sequence of data transmissions 210 to 210 to the user equipment 204, with a periodic transmission of a wireless reference transmission 206 that the user equipment 204 may detect and measure to verify the continued fidelity of the wireless transmission. Such interactions may enable normal communication 214 between the base station 202 and the user equipment 204. At a certain point, an interruption 212 of the data transmissions 210 may occur, such as an interfering transmission by another device that diminishes the wireless transmission quality at the user equipment 204. The user equipment 204 may or may not be capable of determining that communication loss 216 has occurred. The next periodic transmission of the wireless reference transmission 206 may enable the user equipment 204 to initiate a different wireless transmission selection 208 (e.g., the selection and transmission of a beam identifier for a different beam 114 that may present a higher wireless transmission quality), and may enable the user equipment 204 to transmit a second wireless transmission selection 208 to the base station 202 to recover from the communication loss 216 and to restore normal communication 214. In this manner, the interaction sequence 218 between the base station 202 and the user equipment 204 may enable wireless communication therebetween, including the recovery of normal communication 214 in response to the communication loss.

Figure 3:
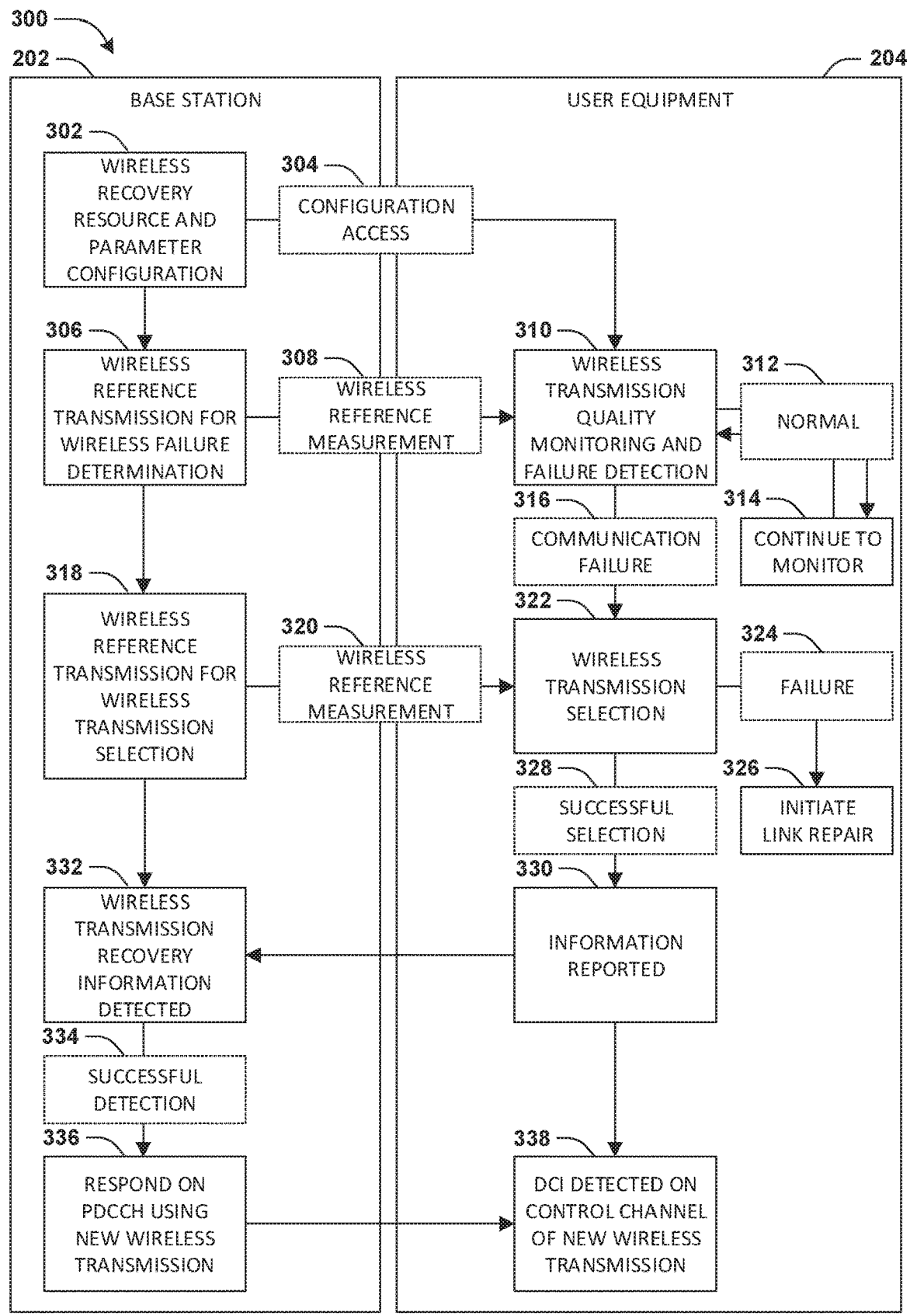
FIG. 3 is an illustration of another example communication process between a transmitter and a receiver.

FIG. 3 is an illustration of another, more detailed example scenario 300 featuring a wireless communication process between a base station 202 and a user equipment 204 device. In this example scenario 300, the base station 202 initiates the wireless communication by transmitting a wireless recovery resource and configuration parameter 302, which is transmitted to and received by the user equipment 204. The base station 202 may periodically transmit wireless reference transmission 306 to promote wireless failure determination, and a first wireless reference measurement 308 is performed by the user equipment 204 to enable wireless transmission quality monitoring and failure detection 310. If the wireless transmission quality monitoring and failure detection 310 produces a normal determination 312, the user equipment 204 continues to monitor 314 the wireless reference transmission 306 during the wireless communication. However, if the user equipment 204 detects a communication failure 316 (such as the interruption 212 of the data transmissions 210 as shown in the example scenario 200 of FIG. 2), the user equipment 204 may await the next periodic wireless reference transmission 318 for wireless transmission selection, and may again perform a wireless reference measurement 320 to perform a wireless transmission selection 322. If the wireless transmission selection 322 results in a failure 324, the base station 202 and/or user equipment 204 may initiate a link repair 326, such as by returning to the start of the interaction. If the wireless transmission selection 322 is successful 328, the user equipment 204 may report 330 the information to the base station 202, which may detect wireless transmission recovery information 332 and, if successful 334, respond on a physical downlink control channel (PDCCH) using the new wireless transmission. The base station 202 and/or user equipment 204 may then detect 338 downlink control signaling (DCI) of the new wireless transmission. In this manner, the base station 202 and the user equipment 204 may engage in wireless communication in a manner that enables detection and recovery of the wireless communication following the communication failure 316.

However, the performance of the wireless transmission in this manner may exhibit disadvantages in some aspects. As a first such example, the periodic transmission of the wireless reference transmission 210 may consume wireless transmission that may otherwise be utilized for data transmission 210, thus increasing the amount of overhead involved in the wireless transmission and reducing the amount of data transmitted per time unit and the efficiency of data transmission as a share of overall wireless transmission. For example, in the example scenario 100B of FIG. 1B, wireless reference transmissions comprise 12 of the 42 total segments or packets, representing an overhead of 28.6% that reduces the transmission of data 116 to 71.4% of the overall wireless transmission. Such loss of efficiency may delay the transmission of a block of data from the transmitter 102 to the receiver 104, and/or may diminish the achievable bandwidth (e.g., the quality of a streaming data session) in terms of the volume of data exchanged per time unit. Moreover, wireless reference transmissions, particularly with a short periodicity, may not provide a significant advantage during normal communication 214 when wireless transmission quality and fidelity are otherwise at least sufficient. As a second such example, the period of communication loss 216 in response to an interruption 212 may be protracted while the user equipment 204 awaits the next periodic wireless reference transmission 206; e.g., the base station 202 may transmit a significant number of data transmission 210 that are not received by the user equipment 204 during the interruption 214 while the user equipment 204 awaits the next wireless reference transmission 206. Such data transmissions 210 may be irrevocably lost, or may have to be retransmitted following recovery of normal communication 214, resulting in a potentially inefficient retransmission process. These consequences may arise from the dependency of communication restoration upon the receipt of the periodically transmitted wireless reference transmission 206.

The currently presented techniques may be utilized to address such disadvantages, as illustrated in the following manner.

Figure 4:
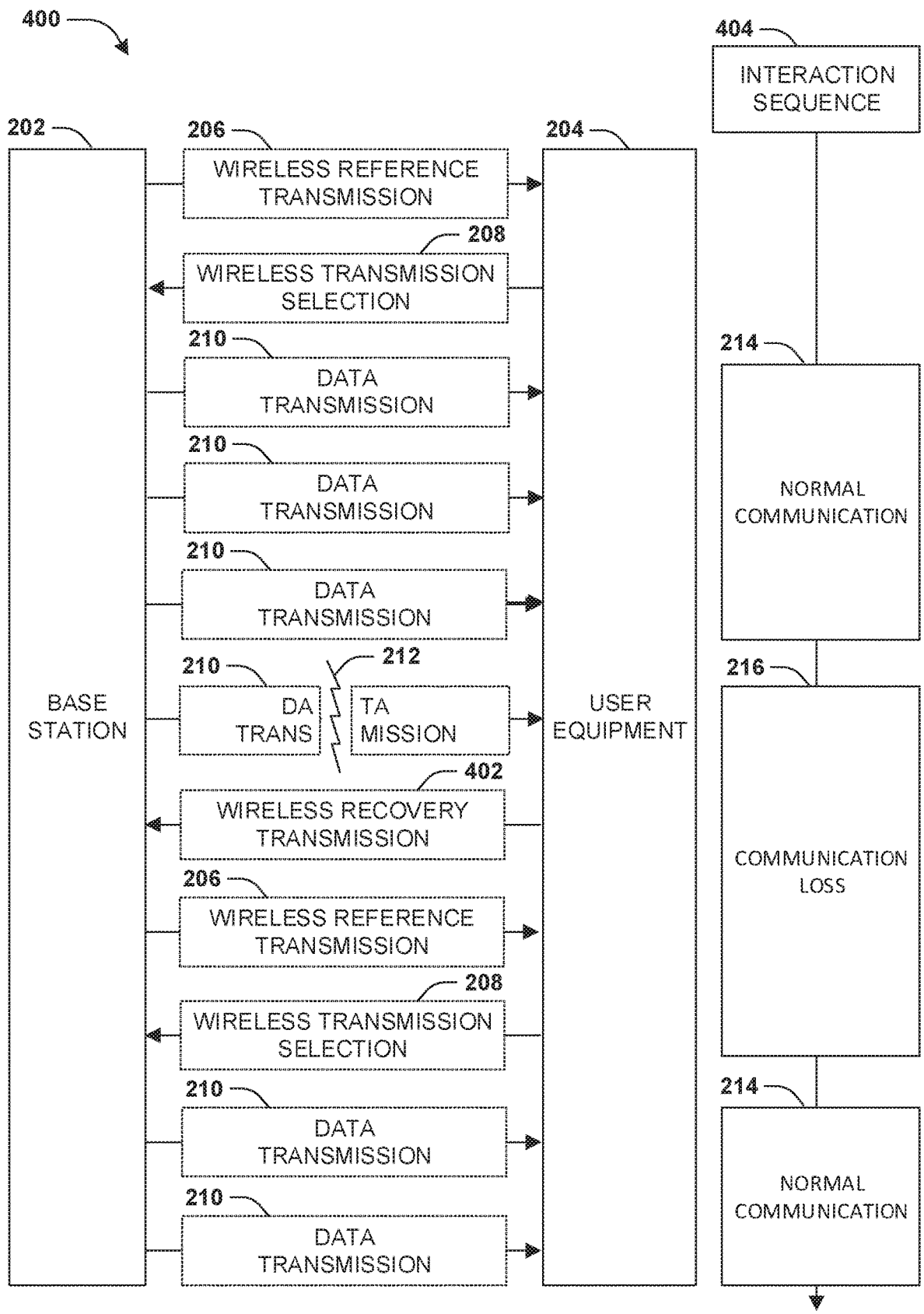
FIG. 4 is an illustration of another example communication process between a transmitter and a receiver in accordance with the techniques presented herein.

The example scenario 400 of FIG. 4 presents an illustration of an interaction sequence 404 between a base station 202 and a user equipment 204 device as a sequence of bidirectional wireless transmissions in accordance with the techniques presented herein. In this example scenario 400, the base station 202 again initiates the wireless communication by transmitting wireless reference transmission 206, which the user equipment 204 receives and utilizes to perform a wireless transmission selection 208, and the user equipment 204 may communicate the selection to the base station 202 as a wireless transmission selection 208. Again, the base station 202 may then initiate a sequence of data transmissions 210 to 210 to the user equipment 204, with a periodic transmission of a wireless reference transmission 206 that the user equipment 204 may detect and measure to verify the continued fidelity of the wireless transmission, which may again enable normal communication 214 between the base station 202 and the user equipment 204. However, the base station 202 does not periodically transmit the wireless reference transmission 206 during normal communication 214, Instead, when an interruption 212 of the data transmissions 210 occurs, the user equipment 204 transmits a wireless recovery transmission 402 to the base station 202. The base station 202 transmits a wireless reference transmission 206 that enables the user equipment 204 to initiate a different wireless transmission selection 208 (e.g., the selection and transmission of a beam identifier for a different beam 114 that may present a higher wireless transmission quality), and may enable the user equipment 204 to transmit a second wireless transmission selection 208 to the base station 202 to recover from the communication loss 216 and to restore normal communication 214. In this manner, the interaction sequence 218 between the base station 202 and the user equipment 204 may enable wireless communication therebetween, including the recovery of normal communication 214 in response to the communication loss, in accordance with the techniques presented herein.

The interaction sequence 404 presented in the example scenario 400 of FIG. 4 may enable a variety of advantages. First, the base station 202 refrains from periodically transmitting the wireless reference transmission 206 during normal communication 214, and instead continues transmitting data transmissions 210 until an interruption 212 occurs, thereby increasing the data rate of the wireless transmission between the base station 202 and the user equipment 204. Second, the duration of the communication loss 216 may be reduced as the user equipment 204 may promptly send the wireless recovery transmission 402 in response to the interruption 212 to initiate wireless transmission recovery, rather than awaiting the next periodic wireless reference transmission 206 as in the example scenario 200 of FIG. 2. In this manner, the base station 202 and the user equipment 204 may achieve a more efficient wireless communication process in accordance with the techniques presented herein.

Figure 5:
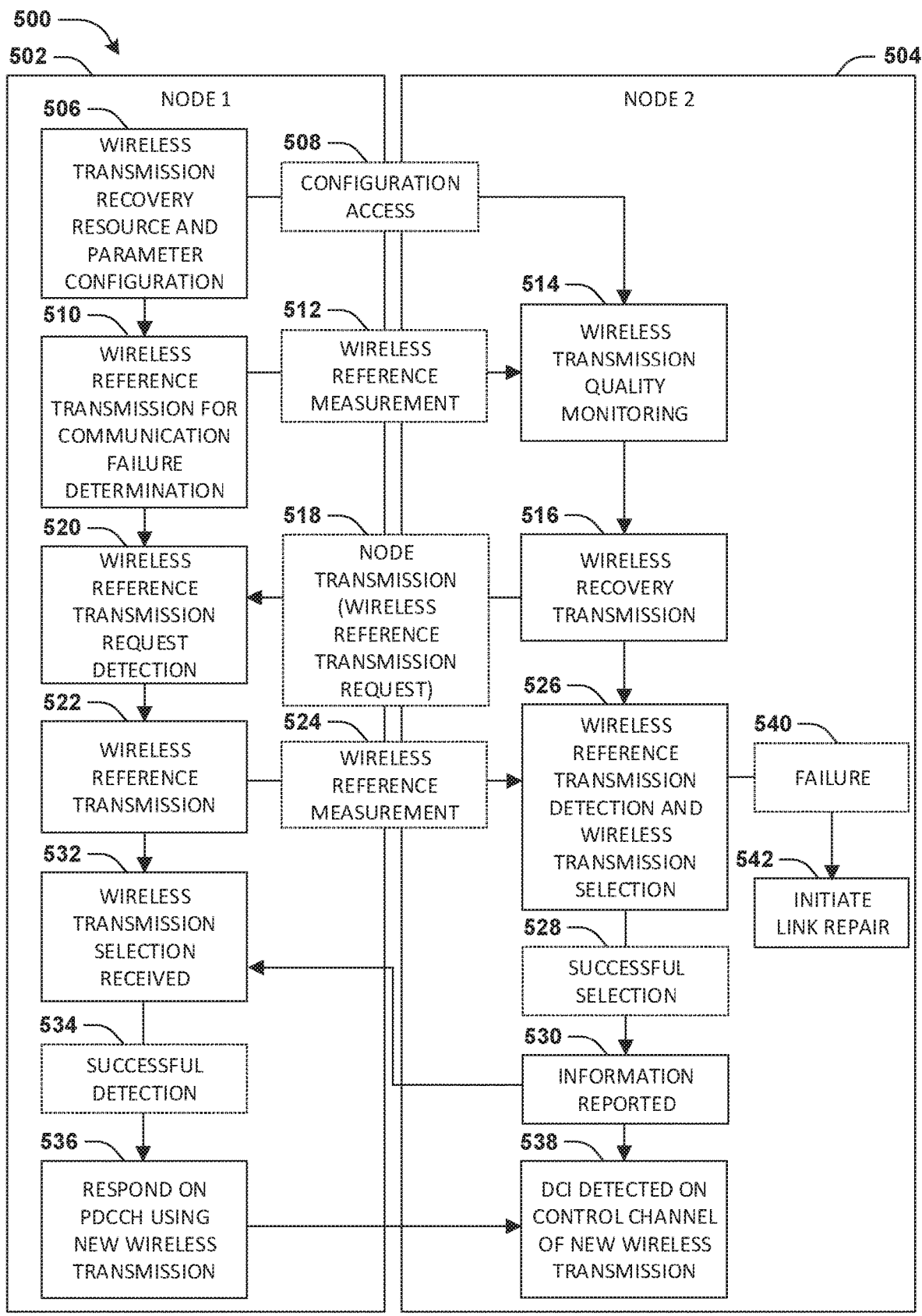
FIG. 5 is an illustration of another example communication process between a transmitter and a receiver in accordance with the techniques presented herein.

FIG. 5 is an illustration of a first specific example scenario 500 featuring a wireless communication process between two nodes in accordance with the techniques presented herein. In this example scenario 500, a first node 502 (such as a base station (BS)) and a second node 504 (such as a user equipment (UE) device) engage in the wireless communication in the following manner. The first node 502 transmits a wireless recovery resource and configuration parameter 506, which is transmitted to and received by the second node 504. The first node 502 transmits wireless reference transmission 510, and a first wireless reference measurement 512 is performed by the second node 504 to enable wireless transmission quality monitoring and failure detection 514. The second node 504 sends a node transmission 518 as a wireless reference transmission request (e.g., a request to the first node 502 to send a wireless reference transmission 520), and in response, the first node 502 sends a wireless reference transmission 522. The second node 504 performs a wireless reference measurement 524 that enables a wireless reference transmission detection and wireless transmission selection 526. If the wireless transmission selection 526 results in a failure 540, the first node 502 and/or second node 504 may initiate a link repair 542, such as by returning to the start of the interaction. If the wireless transmission selection 526 is successful 528, the second node 504 may report 530 the information to the first node 502, which may detect wireless transmission recovery information 532 and, if successful 534, respond 536 on a physical downlink control channel (PDCCH) using the new wireless transmission. The first node 502 and/or second node 504 may then detect 538 downlink control signaling (DCI) of the new wireless transmission. In this manner, the first node 502 and second node 504 may engage in wireless communication in accordance with the techniques presented herein.

Figure 6:
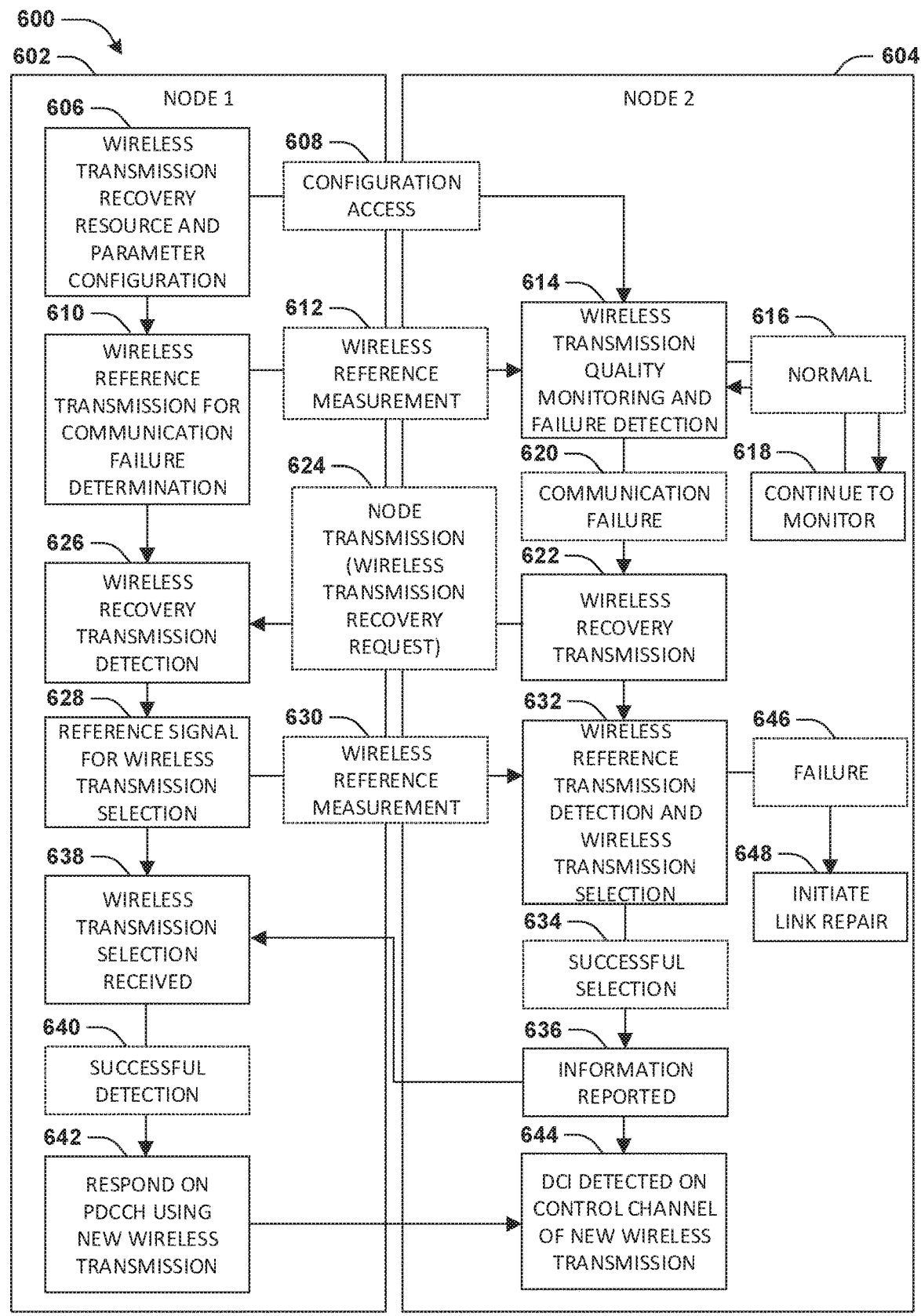
FIG. 6 is an illustration of another example communication process between a transmitter and a receiver in accordance with the techniques presented herein.

FIG. 6 is an illustration of a second specific example scenario 600 featuring a wireless communication process between two nodes in accordance with the techniques presented herein. In this example scenario 600, a first node 602 (such as a base station (BS)) and a second node 604 (such as a user equipment (UE) device) engage in the wireless communication in the following manner. The first node 602 transmits a wireless recovery resource and configuration parameter 606, which is transmitted to and received by the second node 604. The first node 602 performs a wireless transmission quality monitoring and detection failure 614; if normal 616, the node 604 continues to monitor 618 the wireless transmission quality. If the second node 604 detects a communication failure 604, the second node 604 may transmit a node transmission 624 as a wireless transmission recovery request, i.e., a request by the first node 602 to initiate a wireless transmission recovery following the communication failure 620. The first node 602 detects 626 node transmission 624 and sends a wireless reference transmission 628 to the second node 604. The second node 604 performs a wireless reference measurement 630 that enables a wireless reference transmission detection and wireless transmission selection 632. If the wireless transmission selection 632 results in a failure 646, the first node 602 and/or second node 604 may initiate a link repair 648, such as by returning to the start of the interaction. If the wireless transmission selection 632 is successful 634, the second node 604 may report 636 the information to the first node 602, which may detect wireless transmission recovery information 638 and, if successful 640, respond 642 on a physical downlink control channel (PDCCH) using the new wireless transmission. The first node 602 and/or second node 604 may then detect 644 downlink control signaling (DCI) of the new wireless transmission. In this manner, the first node 602 and second node 604 may engage in wireless communication in accordance with the techniques presented herein.

Figure 7:
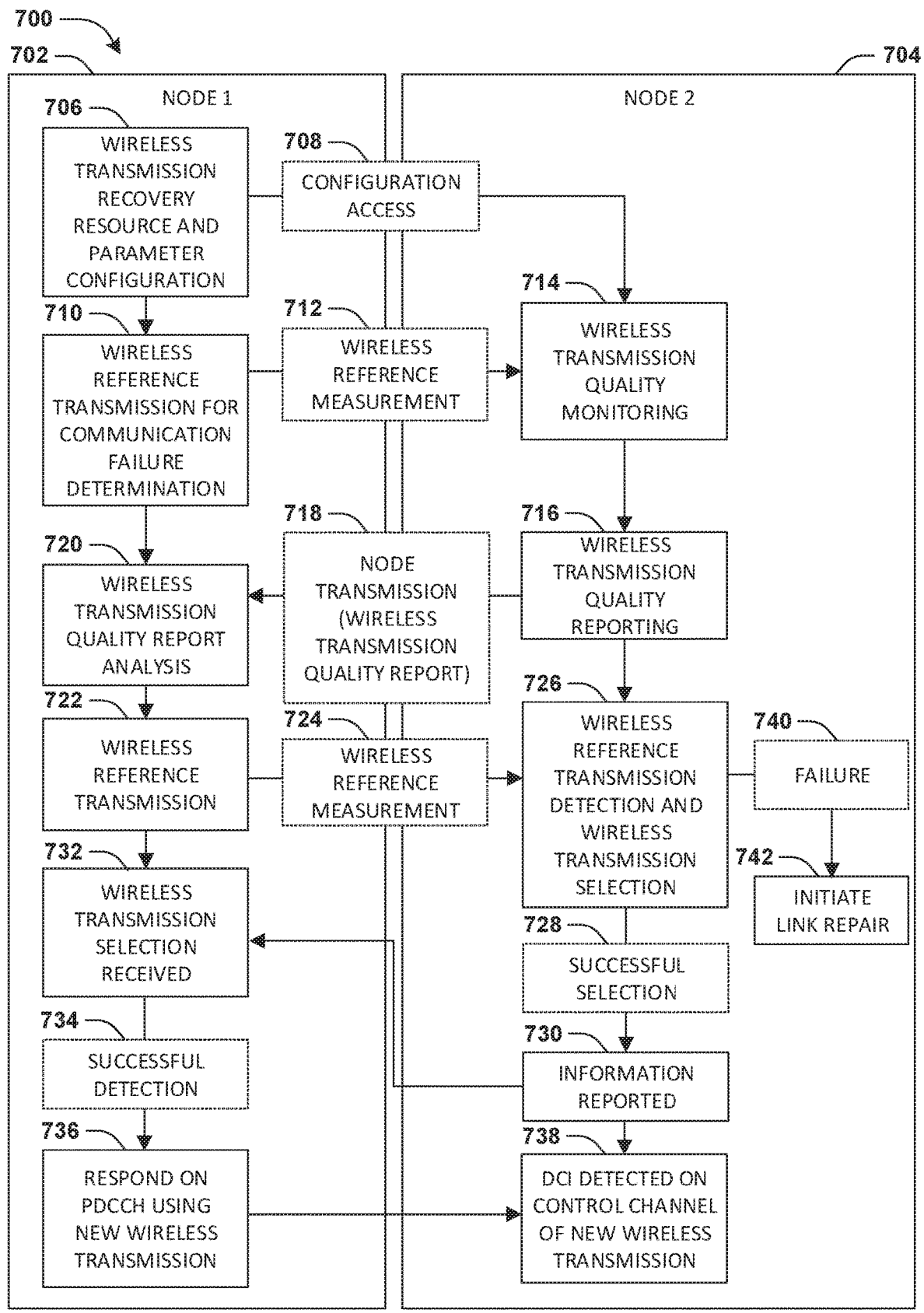
FIG. 7 is an illustration of another example communication process between a transmitter and a receiver in accordance with the techniques presented herein.

FIG. 7 is an illustration of a third specific example scenario 700 featuring a wireless communication process between two nodes in accordance with the techniques presented herein. In this example scenario 700, a first node 702 (such as a base station (BS)) and a second node 704 (such as a user equipment (UE) device) engage in the wireless communication in the following manner. The first node 702 transmits a wireless recovery resource and configuration parameter 706, which is transmitted to and received by the second node 704. The first node 702 (periodically or aperiodically) generates a wireless transmission quality report 716 (e.g., indicating a transmission quality, signal strength, signal-to-noise ratio, error rate, etc.) detected by the second node 704, and sends the wireless transmission quality report 716 to the first node 720 as a node transmission 718. The first node 702 receives and analyzes 720 the wireless transmission quality report 716, and, in response to the analysis 720, may send a wireless reference transmission 722. The second node 704 performs a wireless reference measurement 724 that enables a wireless reference transmission detection and wireless transmission selection 726. If the wireless transmission selection 726 results in a failure 740, the first node 702 and/or second node 704 may initiate a link repair 742, such as by returning to the start of the interaction. If the wireless transmission selection 726 is successful 728, the second node 704 may report 730 the information to the first node 702, which may detect wireless transmission recovery information 732 and, if successful 734, respond 736 on a physical downlink control channel (PDCCH) using the new wireless transmission. The first node 702 and/or second node 704 may then detect 738 downlink control signaling (DCI) of the new wireless transmission. In this manner, the first node 702 and second node 704 may engage in wireless communication in accordance with the techniques presented herein.

Figure 8:
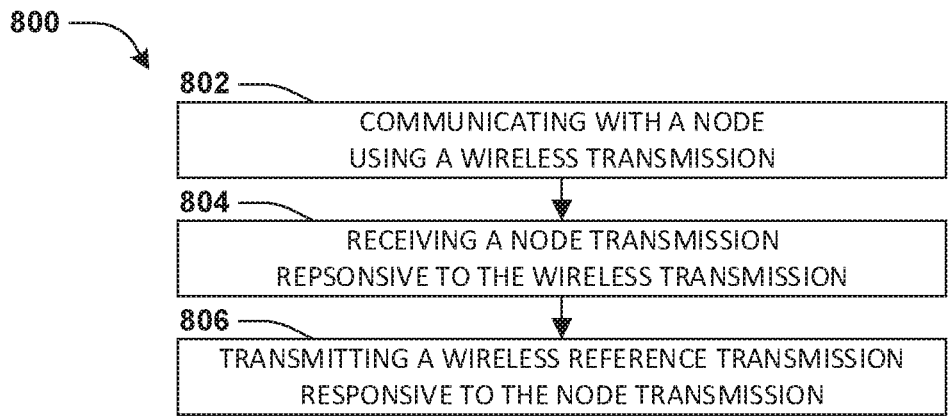
FIG. 8 is an illustration of an example flow diagram of a communication process between a transmitter and a receiver in accordance with the techniques presented herein.

FIG. 8 is an illustration of an embodiment of the currently presented techniques, illustrated as a first example method 800 that may be utilized for wireless communication with a node (e.g., by a transmitter 102 with a node comprising a receiver 104) in accordance with the techniques presented herein. The first example method 800 involves communicating 802 with the node using a wireless transmission. The first example method 800 also involves receiving 804 a node transmission responsive to the wireless transmission. The first example method 800 also involves transmitting 804 a wireless reference transmission responsive to the node transmission.

Figure 9:
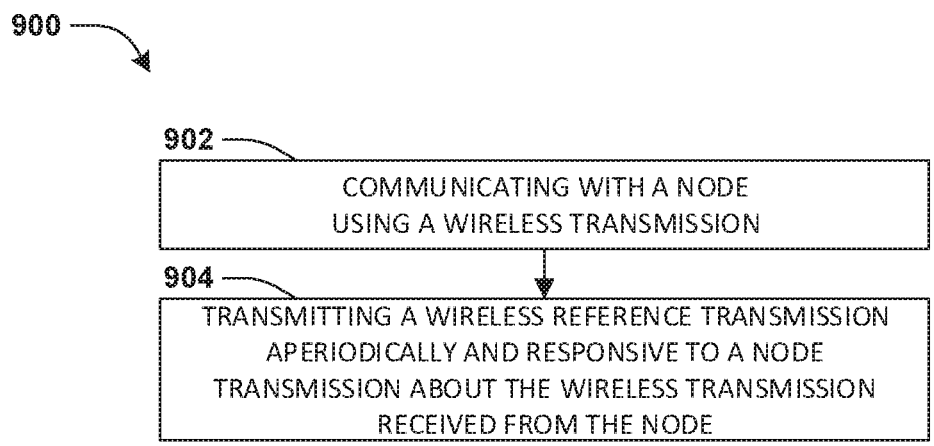
FIG. 9 is an illustration of another example flow diagram of a communication process between a transmitter and a receiver in accordance with the techniques presented herein.

FIG. 9 is an illustration of another embodiment of the currently presented techniques, illustrated as a second example method 900 that may be utilized for wireless communication with a node (e.g., by a receiver 104 with a node comprising a transmitter 102) in accordance with the techniques presented herein. The third example method 900 involves communicating 902 with the node using a wireless transmission. The second example method 900 also involves transmitting 904 a wireless reference transmission aperiodically and responsive to a node transmission received from the node.

Figure 10:
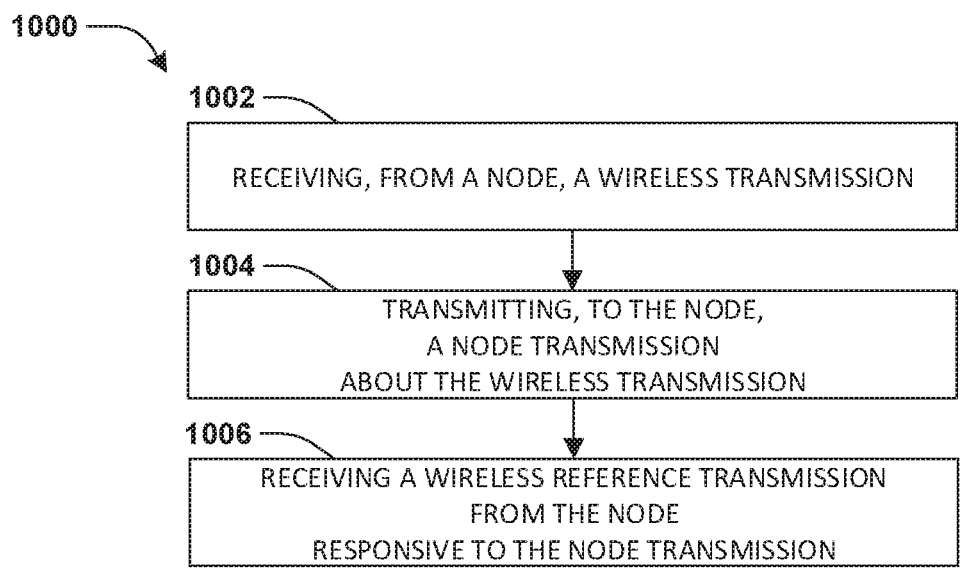
FIG. 10 is an illustration of another example flow diagram of a communication process between a transmitter and a receiver in accordance with the techniques presented herein.

FIG. 10 is an illustration of another embodiment of the currently presented techniques, illustrated as a third example method 1000 that may be utilized for wireless communication with a node (e.g., by a transmitter 102 with a node comprising a receiver 104) in accordance with the techniques presented herein. The third example method 1000 involves receiving 1002, from the node, a wireless transmission. The third example method 100 also involves transmitting 1004, to the node, a node transmission about the wireless transmission. The third example method 100 also involves receiving 1006 a wireless reference transmission from the node responsive to the node transmission.

Many other embodiments of the currently presented techniques are also possible. As a first such example, an embodiment of the currently presented techniques may comprise a wireless communications apparatus (e.g., a base station or a user equipment device, which may operate as a transmitter 102 and/or receiver 104) may comprise a processor; and a memory storing instructions that, when executed by the processor, cause the device to implement a method according to the techniques presented herein, including (e.g.)

implementing one or more of the example method 800 of FIG. 8; the example method 900 of FIG. 9; and/or the example method 1000 of FIG. 10. As a second such example, an embodiment of the currently presented techniques may comprise computer program product comprising a computer-readable medium storing instructions that, when executed by a processor of a wireless communication apparatus, cause the wireless communication apparatus to operate according to the techniques presented herein, such as (e.g.) implementing one or more of the example method 800 of FIG. 8; the example method 900 of FIG. 9; and/or the example method 1000 of FIG. 10. Many such embodiments may be devised in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the method 800 of FIG. 8; the example method 900 of FIG. 9; and/or the example method 1000 of FIG. 10) to confer individual and/or synergistic advantages upon such embodiments.

A first aspect that may vary among embodiments involves the wireless communication scenarios within such techniques may be utilized.

As a first variation of this first aspect, the wireless communication may involve many kinds of wireless communication. Without limitation, such wireless communication may involve various frequencies and/or frequency ranges of the electromagnetic spectrum, such as (e.g.) visible light, infrared, radio, and/or shortwave frequencies. Without limitation, wireless communication may also utilize a non-electromagnetic medium, such as (e.g.) pressure waves transmitted through a substrate in the manner of sound waves. Without limitation, wireless communication may also occur over various ranges, such as (e.g.) small-scale networking, personal area networking, local area networking, wide-area networking, and satellite-range networking.

As a second variation of this first aspect, wireless communication may utilize various mechanisms for transmitting and receiving information. Without limitation, wireless communication may occur using analog and/or digital; unidirectionally and/or bidirectionally; consecutively and/or concurrently; synchronously and/or asynchronously; and point-to-point, multicast, and/or broadcast. Without limitation, wireless communication may utilize various portions of the electromagnetic spectrum and/or may comprise a variety of standards and/or protocols, such as (e.g.) AM/FM radio, WiFi, WiMAX, Bluetooth, infrared, and/or 3G/3.5G/4G/LTE/etc. Without limitation, wireless communication may be established between and among any number of devices serving as nodes, and such nodes may be organized according to various architectures and/or topologies, such as (e.g.) peer-to-peer, server/client, and linear, ring, and/or hierarchical topologies, where such organization may be established in a static, dynamic, or ad hoc manner. Without limitation, wireless transmissions may utilize a variety of additional techniques and features, such as (e.g.) addressing, sequencing, routing, repeating, relaying, acknowledgment, error detection and correction, encryption, authentication, and fault detection and/or recovery. Without limitation, wireless communication may transmit any data type or combination of data types, such as (e.g.) voice, sound, images, video, code, messages, documents, data generated by a component such as a sensor, data for use by an application, or a combination thereof.

As a third variation of this first aspect, a variation of the techniques presented herein may be entirely implemented in a single device. Some devices may, consecutively and/or concurrently, utilize multiple instances and/or variations of the techniques presented herein. Alternatively or additionally, a variation of techniques presented herein may be implemented in a distributed manner across multiple devices; e.g., the base station may comprise a first device or component that receives a node transmission from a receiving node, and a second device or component that transmits a wireless reference transmission responsive to the first device receiving the node transmission.

As a fourth variation of this first aspect, the wireless communication may involve many types of devices. Without limitation, such devices may involve (e.g.) workstations, servers, terminals, media players, gaming consoles, sensors such as cameras and/or microphones, laptops, tablets, mobile phones, palmtop devices, wearable devices, vehicular devices, navigation and/or routing systems, appliances, home automation equipment, industrial equipment (e.g., SCADA), and/or networking and communication devices.

The following description provides some examples of some types of devices that may utilize at least a portion of the techniques presented herein.

Figure 11:
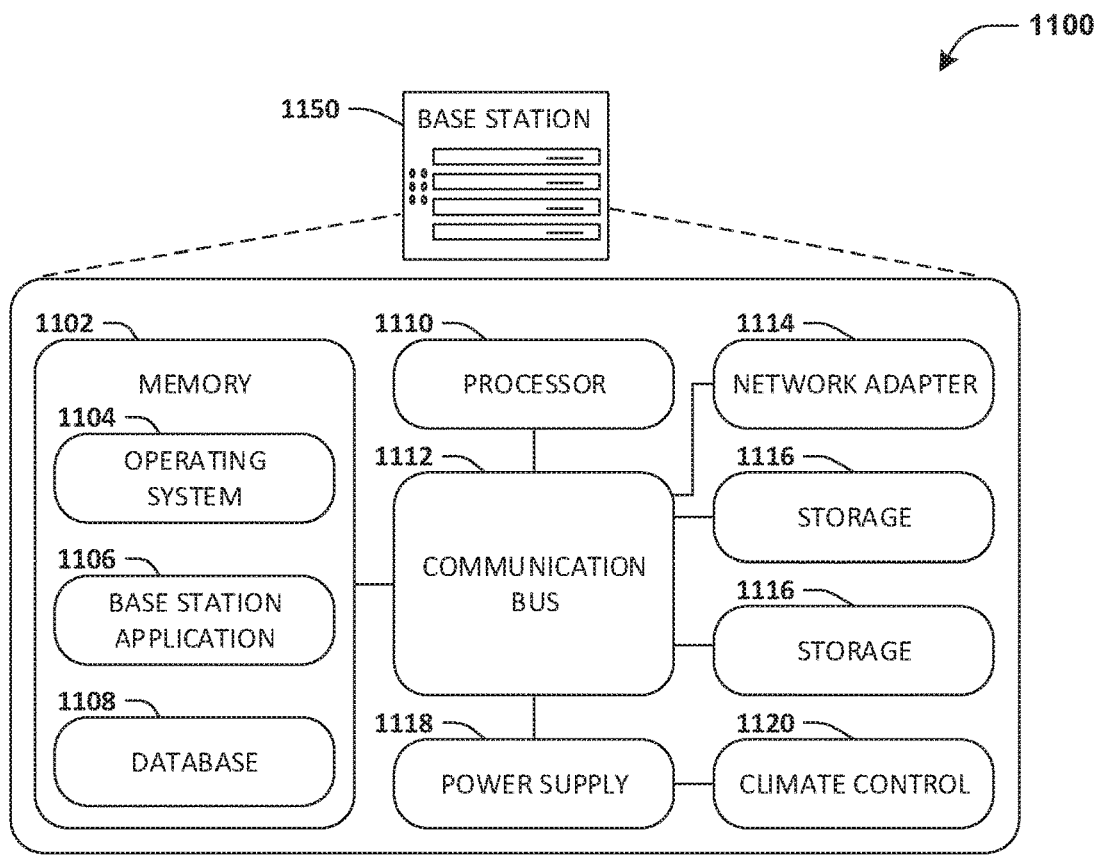
FIG. 11 is an illustration of a scenario involving an example configuration of a base station (BS) that may utilize and/or implement at least a portion of the techniques presented herein.

FIG. 11 presents a schematic architecture diagram 1100 of a base station 1150 (e.g., a node) that may utilize at least a portion of the techniques provided herein. Such a base station 1150 may vary widely in configuration and/or capabilities, alone or in conjunction with other base stations, nodes, end units and/or servers, etc. in order to provide a service, such as at least some of one or more of the other disclosed techniques, scenarios, etc. For example, the base station 1150 may connect one or more user equipment (UE) to a (e.g., wireless) network (e.g., which may be connected and/or include one or more other base stations), such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The network may implement a radio technology, such as Universal Terrestrial Radio Access (UTRA), CDMA13000, Global System for Mobile Communications (GSM), Evolved UTRA (E-UTRA), IEEE 802.11, IEEE 802.16, IEEE 802.20, Flash-OFDM, etc. The base station 1150 and/or the network may communicate using a standard, such as Long-Term Evolution (LTE).

The base station 1150 may comprise one or more (e.g., hardware) processors 1110 that process instructions. The one or more processors 1110 may optionally include a plurality of cores; one or more coprocessors, such as a mathematics coprocessor or an integrated graphical processing unit (GPU); and/or one or more layers of local cache memory. The base station 1150 may comprise memory 1102 storing various forms of applications, such as an operating system 1104; one or more base station applications 1106; and/or various forms of data, such as a database 1108 and/or a file system, etc. The base station 1150 may comprise a variety of peripheral components, such as a wired and/or wireless network adapter 1114 connectable to a local area network and/or wide area network; one or more storage components 1116, such as a hard disk drive, a solid-state storage device (SSD), a flash memory device, and/or a magnetic and/or optical disk reader; and/or other peripheral components.

The base station 1150 may comprise a mainboard featuring one or more communication buses 1112 that interconnect the processor 1110, the memory 1102, and/or various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 1112 may interconnect the base station 1150 with at least one other server. Other components that may optionally be included with the base station 1150 (though not shown in the schematic diagram 1100 of FIG. 12) include a display; a display adapter, such as a graphical processing unit (GPU); input peripherals, such as a keyboard and/or mouse; and/or a flash memory device that may store a basic input/output system (BIOS) routine that facilitates booting the base station 1150 to a state of readiness, etc.

The base station 1150 may operate in various physical enclosures, such as a desktop or tower, and/or may be integrated with a display as an "all-in-one" device. The base station 1150 may be mounted horizontally and/or in a cabinet or rack, and/or may simply comprise an interconnected set of components. The base station 1150 may comprise a dedicated and/or shared power supply 1118 that supplies and/or regulates power for the other components. The base station 1150 may provide power to and/or receive power from another base station and/or server and/or other devices. The base station 1150 may comprise a shared and/or dedicated climate control unit 1120 that regulates climate properties, such as temperature, humidity, and/or airflow. Many such base stations 1150 may be configured and/or adapted to utilize at least a portion of the techniques presented herein.

Figure 12:
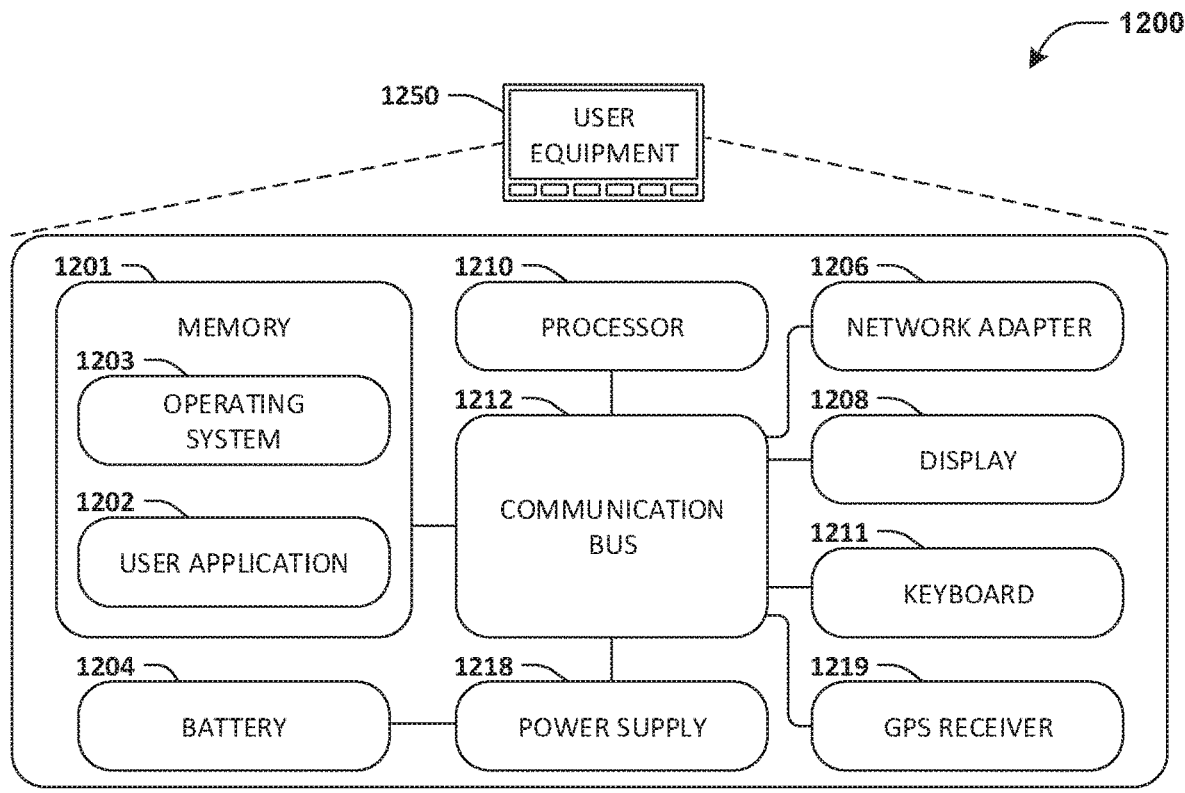
FIG. 12 is an illustration of a scenario involving an example configuration of a user equipment (UE) that may utilize and/or implement at least a portion of the techniques presented herein.

FIG. 12 presents a schematic architecture diagram 1200 of a user equipment (UE) 1250 (e.g., a node) whereupon at least a portion of the techniques presented herein may be implemented. Such a UE 1250 may vary widely in configuration and/or capabilities, in order to provide a variety of functionality to a user. The UE 1250 may be provided in a variety of form factors, such as a mobile phone (e.g., a smartphone); a desktop or tower workstation; an "all-in-one" device integrated with a display 1208; a laptop, tablet, convertible tablet, or palmtop device; a wearable device, such as mountable in a headset, eyeglass, earpiece, and/or wristwatch, and/or integrated with an article of clothing; and/or a component of a piece of furniture, such as a tabletop, and/or of another device, such as a vehicle or residence. The UE 1250 may serve the user in a variety of roles, such as a telephone, a workstation, kiosk, media player, gaming device, and/or appliance.

The UE 1250 may comprise one or more (e.g., hardware) processors 1210 that process instructions. The one or more processors 1210 may optionally include a plurality of cores; one or more coprocessors, such as a mathematics coprocessor or an integrated graphical processing unit (GPU); and/or one or more layers of local cache memory. The UE 1250 may comprise memory 1201 storing various forms of applications, such as an operating system 1203; one or more user applications 1202, such as document applications, media applications, file and/or data access applications, communication applications, such as web browsers and/or email clients, utilities, and/or games; and/or drivers for various peripherals. The UE 1250 may comprise a variety of peripheral components, such as a wired and/or wireless network adapter 1206 connectable to a local area network and/or wide area network; one or more output components, such as a display 1208 coupled with a display adapter (optionally including a graphical processing unit (GPU)), a sound adapter coupled with a speaker, and/or a printer; input devices for receiving input from the user, such as a keyboard 1211, a mouse, a microphone, a camera, and/or a touch-sensitive component of the display 1208; and/or environmental sensors, such as a GPS receiver 1219 that detects the location, velocity, and/or acceleration of the UE 1250, a compass, accelerometer, and/or gyroscope that detects a physical orientation of the UE 1250. Other components that may optionally be included with the UE 1250 (though not shown in the schematic architecture diagram 1200 of FIG. 12) include one or more storage components, such as a hard disk drive, a solid-state storage device (SSD), a flash memory device, and/or a magnetic and/or optical disk reader; a flash memory device that may store a basic input/output system (BIOS) routine that facilitates booting the UE 1250 to a state of readiness; and/or a climate control unit that regulates climate properties, such as temperature, humidity, and airflow, etc.

The UE 1250 may comprise a mainboard featuring one or more communication buses 1212 that interconnect the processor 1210, the memory 1201, and/or various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The UE 1250 may comprise a dedicated and/or shared power supply 1218 that supplies and/or regulates power for other components, and/or a battery 1204 that stores power for use while the UE 1250 is not connected to a power source via the power supply 1218. The UE 1250 may provide power to and/or receive power from other client devices.

Figure 13:
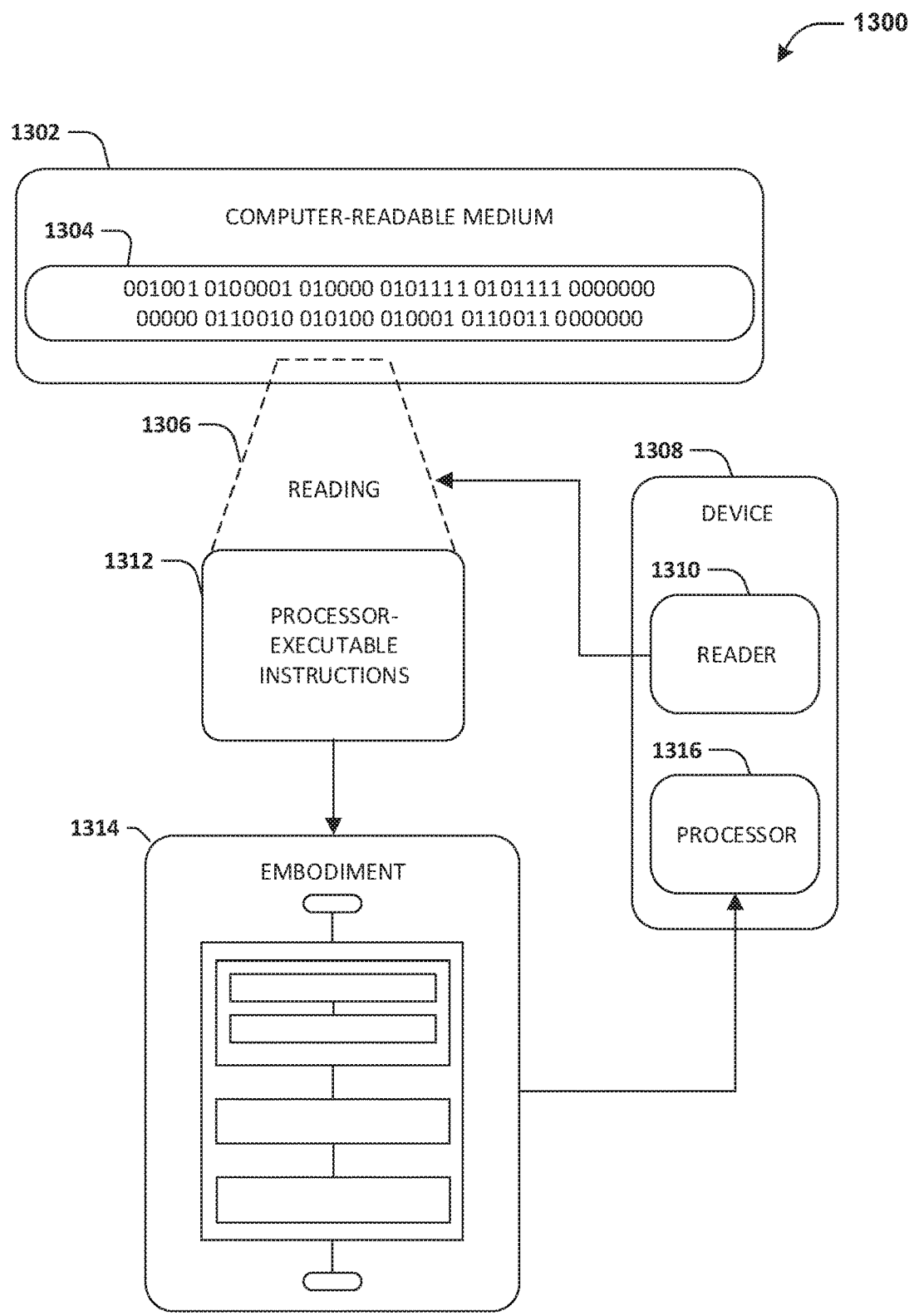
FIG. 13 is an illustration of a scenario featuring an example non-transitory computer readable medium in accordance with one or more of the provisions set forth herein.

FIG. 13 is an illustration of a scenario 1300 involving an example non-transitory computer readable medium 1302. The non-transitory computer readable medium 1302 may comprise processor-executable instructions 1312 that when executed by a processor 1316 cause performance (e.g., by the processor 1316) of at least some of the provisions herein (e.g., embodiment 1314). The non-transitory computer readable medium 1302 may comprise a memory semiconductor (e.g., a semiconductor utilizing static random access memory (SRAM), dynamic random access memory (DRAM), and/or synchronous dynamic random access memory (SDRAM) technologies), a platter of a hard disk drives, a flash memory device, or a magnetic or optical disc (such as a compact disc (CD), digital versatile disc (DVD), and/or floppy disk). The example non-transitory computer readable medium 1302 stores computer-readable data 1304 that, when subjected to reading 1306 by a reader 1310 of a device 1308 (e.g., a read head of a hard disk drive, or a read operation invoked on a solid-state storage device), express the processor-executable instructions 1312. In some embodiments, the processor-executable instructions 1312, when executed, cause performance of operations, such as at least some of the example method 800 of FIG. 8, the example method 900 of FIG. 9, and the example method 1000 of FIG. 10. Many such scenarios may be devised in which the techniques presented here may be advantageously utilized.

A second aspect that may vary among embodiments of the presented techniques involves the node transmission transmitted by a node (such as a receiver and/or user equipment device).

As a first variation of this second aspect, a node may transmit the node transmission on a routine basis, including a periodic basis. As an example, while the node transmission may describe the wireless transmission received from another node (such as a base station), the node transmission may be transmitted irrespective of the measurements of the wireless transmission that are evaluated by the node and/or described in the node transmission. For example, in the example scenario 700 of FIG. 7, the second node 704 transmits the node transmission as a wireless transmission quality report, which describes the wireless transmission quality monitoring 714 detected by the second node 704. The first node 702 may receive the node transmission and perform an analysis 720, and, responsive thereto, may transmit the wireless reference transmission 722 to the second node 704.

As a second variation of this second aspect, a node may transmit the node transmission in response to detecting a communication loss 216 of the wireless transmission. The communication loss 216 may be determined in a variety of ways. As a first such example, the communication loss 216 may be determined according to the measurement of various physical properties of the wireless transmission (e.g., a signal-to-noise ratio (SINR) measurement, or a received power (RSRP) measurement). As a second such example, the communication loss 216 may be determined according to the information content of the wireless transmission (e.g., an error rate that may be above an error rate threshold). As a third such example, the communication loss 216 may be determined according to a detection of an event indicating a communication loss 216 (e.g., a detection of interference, such as competing transmissions at the same electromagnetic frequency by another device) and/or according to an absence of an event indicating normal communication 214 (e.g., a failure to receive wireless transmissions from a base station 202 within a period during which the receipt of wireless transmission is anticipated). As a fourth such example, the communication loss 216 may be detected in a relatively instantaneous manner (e.g., at the moment of communication loss 216) and/or after a period (e.g., after a duration of communication loss 216 that exceeds a threshold). As a fifth such example, the communication loss 216 may be determined in a boolean manner (e.g., whether or not any data is received via wireless transmission) and/or based on a threshold (e.g., data received via wireless transmission at a data rate below a threshold). As a sixth such example, the communication loss 216 may be determined as an objective measurement (e.g., a signal-to-noise ratio compared with a threshold value) and/or as a relative measurement (e.g., a current signal-to-noise ratio compared with a nominal or typical signal-to-noise ratio, including a recent signal-to-noise ratio).

As a third variation of this second aspect, a node may determine a communication loss type of a communication loss 216 of the wireless communication. The determination of the communication loss type may enable various nodes (e.g., transmitters and/or base stations, and/or receivers and/or user equipment) to determine cause and/or recovery techniques that may be utilized to restore the wireless transmission to normal communication 214. As a first such example, a node may determine whether only certain portions of the wireless communication are lost (e.g., a loss of both a synchronization signal (SS) and a channel state information reference signal (CSI-RS) beam, or whether only the channel state information reference signal beam (CSI-RS) is lost while the synchronization signal (SS) is received). As a second such example, a node may monitor at least two wireless transmission beams within a beamformed wireless transmission to detect a communication loss of at least one lost wireless transmission beam, and a count of the lost wireless transmission beams of the wireless transmission, where the count may inform an identification of the communication loss type. As a third such example, a node may evaluate different wavelengths of a multi-frequency wireless transmission, and may determine whether some frequencies remain accessible while other frequencies are inaccessible, or whether all frequencies are inaccessible, where the relative attenuation of different frequencies may indicate a communication loss type. As a fourth such example, a node with multiple antennae may compare transmissions received by the respective antennae, e.g., to determine whether a first antenna receives the wireless transmission in a different manner than a second antenna, where the comparison may indicate a communication loss type. As a fifth such example, a first node may compare the wireless transmission that it receives with a second node that also receives the same or a different wireless transmission, where the comparison may indicate a communication loss type. In an example, information about the communication loss type of the communication loss 216 may be included in the node transmission, which may enable another node that receives the node transmission (e.g., a base station) to respond to the communication loss 216. The communication loss type may be determined by a second node that transmits the node transmission, and/or by a first node that receives the node transmission (e.g., a base station may deduce the communication loss type from the contents of a wireless transmission quality report). As a sixth such example, a first node (e.g. a mobile terminal) may measure a predetermined reference resource which carries a reference signal, corresponding to a beam to be tracked and measured, transmitted by a second node (e.g. a base station). A first node obtains a measurement results such as reference signal received power (RSRP) or SINR etc. In an example, a first node compares a measurement result with a predefined threshold (for example, the threshold can be determined by a second node, e.g. a base station) to determine whether to report a transmission quality indication. In another example, a first node compares a measurement result of RSRP with a predefined threshold (for example, the threshold can be determined by a second node, e.g. a base station). If the measurement result of RSRP is below a predefined threshold, a first node may determine a communication loss occurs on the corresponding beam or a beam transmission fails; if the measurement result of RSRP equals or is greater than a predefined threshold, a first node may further compares a measurement result of SINR with a predefined threshold (for example, a threshold can be determined by a second node, e.g. a base station) to determine whether to report a transmission quality indication.

As a fourth variation of this second aspect, the communication loss 216 determined by a node may result in various types of node transmissions responsive thereto. The example scenario 500 of FIG. 5 presents a first such example, wherein the second node 504 transmits the node transmission as a wireless reference transmission request that requests the first node 502 (e.g., a base station) to transmit the wireless reference transmission. The example scenario 600 of FIG. 6 presents a second such example, wherein the second node 504 transmits the node transmission as a wireless transmission recovery request that requests the first node 502 (e.g., a base station) to initiate a wireless transmission recovery process, which may include transmitting the wireless reference transmission. As an example, a communication loss type of the communication loss may determine the type of node transmission that a node transmits to another node. As an example, a node may transmit different types of node transmissions (e.g., both a periodic transmission of a wireless transmission quality report such as in the example scenario 600 of FIG. 6, and a wireless transmission recovery request that is transmitted in response to detecting a communication loss 216).

As a fifth variation of this second aspect, a node may transmit a node transmission in various ways relative to the wireless transmission to which the node transmission relates. As a first such example, the node transmission may be transmitted on the same frequency as the wireless transmission, or as a different frequency. As a second such example, the node transmission may be transmitted in the same manner as the wireless transmission (e.g., as a wireless signal using the same equipment) and/or in a different manner (e.g., as a different wireless signal using different equipment, or even as a wired transmission between a receiver and a transmitter). As a third such example, the node transmission may be transmitted using the same wireless communication protocol and/or format as the wireless transmission, and/or using a different wireless communication protocol and/or format than the wireless transmission. As a fourth such example, the node transmission may be transmitted in multiple ways (e.g., multiple transmissions via different media) to promote the receipt of the node transmission by another node (e.g., by the base station). Many variations may be included in the node transmission in accordance with the techniques presented herein. As a fifth such example, a second node (such as a first receiver) may transmit a node transmission to a first node (such as a first transmitter) on behalf of a third node (such as a second receiver that is experiencing a communication loss 216 of wireless transmissions from the second node). As a sixth such example, a second node (such as a first receiver) that experiences a communication loss of a wireless transmission from a first node (such as a first transmitter) may transmit a node transmission to a third node (such as a second transmitter with which the first node is capable of communicating, and which may also be capable of communicating with the first transmitter).

A third aspect that may vary among embodiments of the presented techniques involves the wireless reference transmission that is transmitted in response to the node transmission.

As a first variation of this third aspect, the wireless reference transmission may comprise many types of reference transmissions. As a first such example, the wireless reference transmission may comprise a synchronization signal (SS), a channel-specific reference signal (CRS), a position reference signal (PRS), and/or a channel state information reference signal (CSI-RS), and/or a combination thereof. As a second such example, the wireless reference transmission may comprise the same type of reference transmission as utilized by the nodes while initiating the wireless transmission, and/or a different type of reference transmission. As a third such example, the wireless reference transmission may be instantaneously and/or promptly transmitted responsive to the node transmission, and/or may transmitted responsive to the node transmission but after a delay (e.g., at a designated interval during which wireless reference transmissions are transmitted on condition of a recently received node transmission).

As a second variation of this third aspect, the wireless reference transmission may vary in response to a communication loss type of a communication loss 216. That is, a first wireless reference transmission may be transmitted responsive to a communication loss 216 of a first communication loss type, and a second wireless reference transmission may be transmitted responsive to a communication loss 216 of a second communication loss type that is different than the first communication loss type.

As a third variation of this third aspect, a node (such as a base station) may reserve transmission resources for wireless reference transmissions, and may transmit the wireless reference transmission using the reserved transmission resources responsive to a node transmission. As a further example, a node that transmits different wireless reference transmissions in different circumstances may reserve a collection of wireless transmission resources (e.g., a reserved frequency range reserved for transmitting wireless reference transmissions), and may utilize a subset of the reserved collection of wireless transmission resources for a particular wireless reference transmission of a wireless reference transmission type (e.g., a first frequency within the reserved frequency range for a first type of wireless reference transmission, and a second frequency within the reserved frequency range for a second type of wireless reference transmission). Many such variations may be utilized in generating the wireless reference transmissions in accordance with the techniques presented herein.

A fourth aspect that may vary among embodiments of the techniques presented herein involves the use of the wireless reference transmission received by a node (such as the node that transmitted the node transmission).

As a first variation of this fourth aspect, the node(s) that transmit and/or receive the wireless reference transmission may utilize the wireless reference transmission in a wireless transmission recovery process. For example, a first node (such as a base station) may select a wireless reference transmission type according to the communication loss type, and transmit a wireless reference transmission of the wireless reference transmission type. As an example, the wireless reference transmission further comprises at least two wireless reference transmissions respectively comprising a wireless transmission identifier (e.g., in a beamformed wireless transmission scenario, a device may transmit a variety of reference beams that respectively encode a beam identifier). A second node (such as a user equipment device) may detect the respective at least two wireless reference transmissions, and may measuring a wireless reference beam parameter (e.g., a signal-to-noise ratio and/or a received signal power), and may select a wireless transmission identifier of a selected wireless reference transmission according to the wireless reference transmission parameter (e.g., the beam identifier of the beam exhibiting the highest signal-to-noise ratio). The second node may transmit the wireless transmission identifier of the selected wireless reference transmission to the first node, thereby enabling the first node to communicate with the second node using a beamformed wireless transmission that restores normal communication 214 therebetween. As a second such example, the recovery process may not be successful; e.g., a node may fail to receive a second wireless transmission parameter responsive to the wireless reference transmission (e.g., a selection of a beam identifier that exhibits satisfactory wireless transmission quality). The nodes may therefore initiate a link reconstruction of the wireless transmission to the node responsive to the failure of the wireless transmission recovery process, such as performing a second complete wireless transmission initiation process whereby the first node and the second node initially established communication. Many such processes may utilize a wireless reference transmission responsive to a node transmission exchanged between and/or among various nodes in accordance with the techniques presented herein.

The descriptions of the techniques presented herein are to be understood according to the following principles of language usage.

As used in this disclosure, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers (e.g., nodes(s)).

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer (e.g., node) to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments and/or examples are provided herein. The order in which some or all of the operations are described herein should not be construed as to imply that these operations are necessarily order dependent. Alternative ordering will be appreciated by one skilled in the art having the benefit of this description. Further, it will be understood that not all operations are necessarily present in each embodiment and/or example provided herein. Also, it will be understood that not all operations are necessary in some embodiments and/or examples.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A wireless communication method implemented by a base station (BS), comprising:
    transmitting a first wireless reference transmission to a user equipment (UE), wherein the first wireless reference transmission enables the UE to verify continued fidelity of transmission from the BS;
    receiving, from the UE, a wireless transmission selection that indicates a beam chosen by the UE;
    transmitting a sequence of data transmissions to the UE during a period of time in which the first wireless reference transmission is transmitted when needed;
    receiving, from the UE, a wireless recovery transmission that indicates an interruption of a separate wireless transmission, wherein the interruption of the wireless transmission includes a communication loss of the separate wireless transmission;
    periodically receiving, from the UE, a wireless transmission quality report that indicates a wireless property of the separate wireless transmission; and
    transmitting, in response to receiving the wireless recovery transmission and in response to analyzing the wireless transmission quality report, a second wireless reference transmission different than the first wireless reference transmission using a subset of reserved transmission resources to enable the UE to select a second beam to restore communication with the BS,
        wherein the subset of the reserved transmission resources is based on a type of the second wireless reference transmission, and
        wherein the type of the second wireless reference transmission is based on a type of a communication loss type of the communication loss of the separate wireless transmission.

2. The method of claim 1,
    wherein the method further comprises:
    determining the communication loss type of the communication loss, wherein the communication loss type includes: a loss of at least one wireless transmission beam; a loss of at least one frequency used for transmission; or a measured value for a signal being below a pre-determined threshold value.

3. The method of claim 1,
    wherein the separate wireless transmission further comprises a synchronization signal and/or a channel state information reference signal, and
    wherein the method further comprises:
    determining the communication loss type of the communication loss by determining the communication loss of the synchronization signal or the channel state information reference signal within the separate wireless transmission.

4. The method of claim 1,
wherein the separate wireless transmission further comprises at least two wireless transmission beams, and
wherein the method further comprises:
determining the communication loss type of the communication loss by determining, by the base station, a number of lost wireless transmission beams among the at least two wireless transmission beams of the separate wireless transmission.

5. A wireless communication method implemented by a user equipment (UE), comprising:
receiving a first wireless reference transmission, wherein the first wireless reference transmission enables the UE to verify continued fidelity of transmission from a base station (BS);
transmitting, by the UE, a wireless transmission selection that indicates a beam chosen by the UE;
receiving, by the UE, a sequence of data transmissions during a period of time in which the first wireless reference transmission is received by the UE from the BS when needed;
transmitting, to the BS, a wireless recovery transmission that indicates an interruption of a separate wireless transmission, wherein the interruption of the wireless transmission includes a communication loss of the separate wireless transmission;
periodically transmitting, to the BS, a wireless transmission quality report that indicates a wireless property of the wireless transmission; and
receiving, in response to transmitting the wireless recovery transmission and in response to periodically transmitting the wireless transmission quality report, a second wireless reference transmission different than the first wireless reference transmission on a subset of reserved transmission resources, wherein the UE selects a second beam after receiving the second wireless reference transmission to restore communication with the BS,
wherein the subset of the reserved transmission resources is based on a type of the second wireless reference transmission, and
wherein the type of the second wireless reference transmission is based on a type of a communication loss type of the communication loss of the separate wireless transmission.

6. The method of claim 5, further comprising:
detecting the communication loss of the separate wireless transmission,
wherein the wireless recovery transmission that indicates the interruption of the separate wireless transmission is transmitted in response to the detecting the communication loss of the separate wireless transmission, and
wherein the wireless recovery transmission indicates the communication loss of the separate wireless transmission.

7. The method of claim 5, further comprising:
detecting the communication loss type of the communication loss of the separate wireless transmission,
wherein the communication loss type is associated with: a loss of at least one wireless transmission beam; a loss of at least one frequency used for transmission; or a measured value for a signal being below a pre-determined threshold value, and
wherein the wireless recovery transmission includes the communication loss type of the communication loss.

8. The method of claim 5, further comprising:
detecting the communication loss of the separate wireless transmission by monitoring, within the separate wireless transmission, at least two wireless transmission beams to detect the communication loss of at least one lost wireless transmission beam, wherein the wireless recovery transmission includes an indication of a count of at least one lost wireless transmission beam of the separate wireless transmission.

9. A wireless communications apparatus in a base station (BS), comprising:
a processor; and
a memory storing instructions that, when executed by the processor, cause the processor to implement a method comprising:
transmit, by a base station (BS), a first wireless reference transmission to a user equipment (UE), wherein the first wireless reference transmission enables the UE to verify continued fidelity of transmission from the BS;
receive, from the UE, a wireless transmission selection that indicates a beam chosen by the UE;
transmit a sequence of data transmissions to the UE during a period of time in which the first wireless reference transmission is transmitted when needed;
receive, from the UE, a wireless recovery transmission that indicates an interruption of a wireless transmission, wherein the interruption of the separate wireless transmission includes a communication loss of the separate wireless transmission;
periodically receive, from the UE, a wireless transmission quality report that indicates a wireless property of the separate wireless transmission; and
transmit, in response to the received wireless recovery transmission and in response to analyzing the wireless transmission quality report, a second wireless reference transmission different than the first wireless reference transmission using a subset of reserved transmission resources to enable the UE to select a second beam to restore communication with the BS,
wherein the subset of the reserved transmission resources is based on a type of the second wireless reference transmission, and
wherein the type of the second wireless reference transmission is based on a type of a communication loss type of the communication loss of the wireless transmission.

10. The wireless communications apparatus of 9,
wherein the method further comprises:
determine the communication loss type of the communication loss, wherein the communication loss type includes: a loss of at least one wireless transmission beam; a loss of at least one frequency used for transmission; or a measured value for a signal being below a pre-determined threshold value.

11. The wireless communications apparatus of 9,
wherein the separate wireless transmission further comprises a synchronization signal and/or a channel state information reference signal, and
wherein the method further comprises:
determine the communication loss type of the communication loss includes determine the communication loss of the synchronization signal or the channel state information reference signal within the separate wireless transmission.

12. The wireless communications apparatus of 9,
wherein the separate wireless transmission further comprises at least two wireless transmission beams, and
wherein the determine the communication loss type of the communication loss includes determine, by the base station, a number of lost wireless transmission beams among the at least two wireless transmission beams of the separate wireless transmission.

13. A wireless communications apparatus in a user equipment (UE), comprising:
a processor; and
a memory storing instructions that, when executed by the processor, cause the processor to implement a method comprising:
receive a first wireless reference transmission, wherein the first wireless reference transmission enables the UE to verify continued fidelity of transmission from a base station (BS);
transmit, by the UE, a wireless transmission selection that indicates a beam chosen by the UE;
receive a sequence of data transmissions during a period of time in which the first wireless reference transmission is received by the UE from the BS when needed;
transmit, to the BS, a wireless recovery transmission that indicates an interruption of a separate wireless transmission, wherein the interruption of the separate wireless transmission includes a communication loss of the separate wireless transmission;
periodically transmit, to the BS, a wireless transmission quality report that indicates a wireless property of the separate wireless transmission; and
receive, in response to the transmit the wireless recovery transmission and in response to the periodically transmit the wireless transmission quality report, a second wireless reference transmission different than the first wireless reference transmission on a subset of reserved transmission resources, wherein the UE selects a second beam after receiving the second wireless reference transmission to restore communication with the BS,
wherein the subset of the reserved transmission resources is based on a type of the second wireless reference transmission, and
wherein the type of the second wireless reference transmission is based on a type of a communication loss type of the communication loss of the separate wireless transmission.

14. The wireless communications apparatus of 13, wherein the method further comprises:
detect the communication loss of the separate wireless transmission,
wherein the wireless recovery transmission that indicates the interruption of the separate wireless transmission is transmitted in response to the detected communication loss of the separate wireless transmission, and
wherein the wireless recovery transmission indicates the communication loss of the separate wireless transmission.

15. The wireless communications apparatus of 13, wherein the method further comprises:
detect the communication loss type of the communication loss of the separate wireless transmission,
wherein the communication loss type is associated with: a loss of at least one wireless transmission beam; a loss of at least one frequency used for transmission; or a measured value for a signal being below a pre-determined threshold value, and
wherein the wireless recovery transmission includes the communication loss type of the communication loss.

16. The wireless communications apparatus of 13, wherein the method further comprises:
detect the communication loss of the separate wireless transmission by monitor, within the separate wireless transmission, at least two wireless transmission beams to detect the communication loss of at least one lost wireless transmission beam, wherein the wireless recovery transmission includes an indication of a count of at least one lost wireless transmission beam of the separate wireless transmission.

17. The method of claim 1, wherein the period of time includes a communication loss period.

18. The method of claim 5, wherein the period of time includes a communication loss period.

19. The wireless communications apparatus of claim 9, wherein the period of time includes a communication loss period.

20. The wireless communications apparatus of claim 13, wherein the period of time includes a communication loss period.

\* \* \* \* \*